(12) United States Patent
Evans et al.

(10) Patent No.: US 11,922,973 B2
(45) Date of Patent: Mar. 5, 2024

(54) DIGITAL VIDEO PRODUCTION SYSTEMS AND METHODS

(71) Applicant: Canva Pty Ltd, Surry Hills (AU)

(72) Inventors: Michael Evans, Darlinghurst (AU); Jessica Faccin, Sydney (AU); Cameron Adams, Rozelle (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/711,393

(22) Filed: Apr. 1, 2022

(65) Prior Publication Data
US 2022/0335973 A1    Oct. 20, 2022

(30) Foreign Application Priority Data

Apr. 16, 2021    (AU) ................................ 2021202306

(51) Int. Cl.
*G11B 27/031* (2006.01)
*G06F 3/0482* (2013.01)
*G11B 27/34* (2006.01)

(52) U.S. Cl.
CPC .......... *G11B 27/031* (2013.01); *G06F 3/0482* (2013.01); *G11B 27/34* (2013.01)

(58) Field of Classification Search
CPC ...... G11B 27/031; G11B 27/34; G06F 3/0482
See application file for complete search history.

(56) References Cited

U.S. PATENT DOCUMENTS

| | | | |
|---|---|---|---|
| 7,788,605 B1 | 8/2010 | Shoemaker | |
| 7,805,678 B1 | 9/2010 | Niles et al. | |
| 7,890,867 B1 | 2/2011 | Margulis | |
| 9,609,260 B2* | 3/2017 | Kulas | ...................... G06Q 30/06 |
| 2003/0002851 A1* | 1/2003 | Hsiao | ................... G11B 27/034 386/280 |
| 2010/0281377 A1 | 11/2010 | Meaney et al. | |
| 2010/0281378 A1 | 11/2010 | Pendergast et al. | |
| 2010/0281379 A1 | 11/2010 | Meaney et al. | |
| 2014/0328577 A1* | 11/2014 | Roberts, Jr. | ............ G11B 27/10 386/282 |
| 2015/0178971 A1* | 6/2015 | Patrick | .................... G06T 13/20 345/473 |
| 2018/0300036 A1* | 10/2018 | Bhatt | ................... G11B 27/031 |

OTHER PUBLICATIONS

European Search Report for EP22167830 dated Sep. 9, 2022 (Entire Document).
Examination Report No. 1 for application AU2021202306, dated Apr. 1, 2022.
European Search Report for EP22167845 dated Sep. 21, 2022 (Entire Document).

* cited by examiner

*Primary Examiner* — Mishawn N. Hunter
(74) *Attorney, Agent, or Firm* — GrowIP Law Group LLC

(57) ABSTRACT

Described herein is a computer implemented method. The method includes displaying, on a display, a scene timeline including a time-ordered sequence of scene previews, each scene preview corresponding to a scene of a video production and having a display width that provides a visual indication of a duration of that scene. The method further includes displaying a canvas including a first visual element that is associated with the first scene, and in response to detecting selection of the first visual element from the canvas, causing a first visual element timing indicator to be displayed. The first visual element timing indicator is aligned with the scene timeline based on a first visual element start time and a first visual element end time.

20 Claims, 15 Drawing Sheets

DIGITAL VIDEO PRODUCTION SYSTEMS AND METHODS

CROSS-REFERENCE TO RELATED APPLICATION

This application is a U.S. Non-Provisional Application that claims priority to Australian Patent Application No. 2021202306, filed Apr. 16, 2021, which is hereby incorporated by reference in its entirety.

FIELD

The present disclosure is directed to systems and methods for creating and/or editing digital video productions.

BACKGROUND

Various tools for creating and editing digital video productions exist. Generally speaking, such tools can be used to create a video production by adding various content elements—for example video footage, graphic overlays, audio tracks and/or effects—and setting the timing for when those content elements are played or displayed.

SUMMARY

Described herein is a computer implemented method including: accessing production data in respect of a video production, the production data including scene data defining one or more scenes of the video production and visual element data defining one or more visual elements of the video production, each visual element being associated with a scene; displaying, on a display, a scene timeline, the scene timeline including a time-ordered sequence of scene previews, each scene preview corresponding to a scene of the one or more scenes and having a display width that provides a visual indication of a duration of the corresponding scene; detecting selection of a first scene preview from the scene timeline, the first scene preview associated with a first scene of the video production; in response to detecting selection of the first scene preview, displaying a canvas including a first visual element that is associated with the first scene, the first visual element including a first visual element start time and a first visual element end time; detecting selection of the first visual element from the canvas; and in response to detecting selection of the first visual element from the canvas, causing a first visual element timing indicator to be displayed, the first visual element timing indicator aligned with the scene timeline based on the first visual element start time and the first visual element end time.

BRIEF DESCRIPTION OF THE DRAWINGS

Preferred embodiments of the invention will be described, by way of examples only, with reference to the accompanying representations, wherein.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally concerned with creating and editing digital video productions (which will also be referred to as 'productions' for short).

As described above, tools for creating and editing productions are known. The user interfaces (UIs) of existing tools, however, can be complex to understand and interact with. In addition, user interfaces of know digital video production tools can occupy a relatively large display area.

Figure 1:
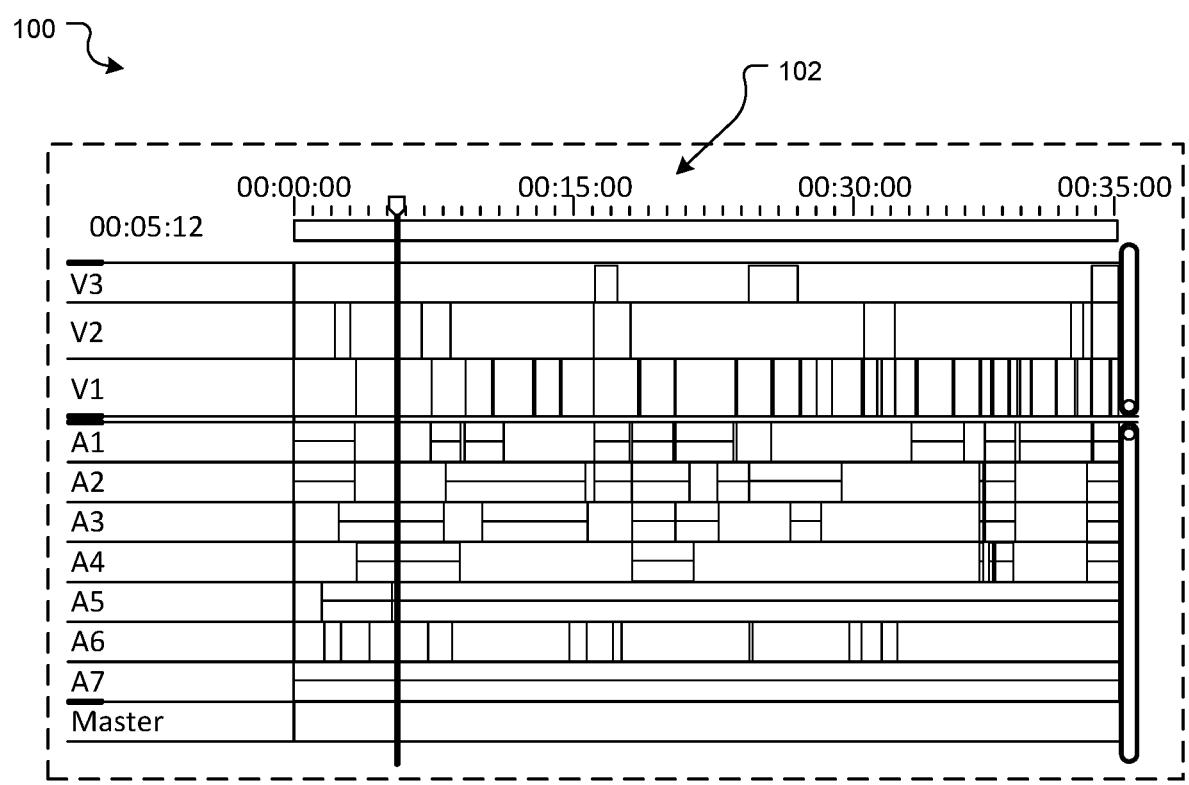
FIG. 1 shows an example video production timeline.

FIG. 1 provides an example of a known type of digital video production timeline UI 100. Timeline UI 100 represents a video production which includes three visual content elements (V1, V2, and V3) and seven audio content elements (A1, A2, A3, A4, A5, A6, and A7).

In UI 100, a timeline 102 is displayed representing the duration (or part of the duration) of the video production. Each content element of the video production is then provided with a play indicator that indicates when the content of that element is played.

As can be seen, the display area occupied by timeline UI 100 is significant. This is particularly the case given timeline UI 100 will typically be only one part of a broader video production UI that would typically be used for creating and editing video productions. For example, a broader production UI would typically include a preview interface for a user to preview the production in question and various controls for editing the production in question or elements thereof.

The present disclosure provides alternative user interfaces, user interface interactions, and processing techniques for creating and editing digital video productions.

A digital video production is, ultimately, a dataset that can be processed to display the production. Generally speaking, a production dataset will include (or at least reference) content data (e.g. data in respect of video, graphic, and audio elements that make up the production) and metadata—for example element timing data that defines when a given element is to play, element size and position data (for visual elements), volume data (for audio elements), and other data in respect of the production and/or elements the form part thereof.

The precise data that makes up production dataset, and the structures used to store that data, can vary greatly. This section provides one example of production data, and the examples that follow are in the context of his example. It will be appreciated, however, that alternatives are possible and the processing described herein can be adapted to work with different types of production data stored in different ways.

In the present disclosure, a production includes an ordered sequence of one or more scenes and one or more elements. Generally speaking, an element may be a visual element or an audio element.

Visual elements herein are divided into what will be referred to as video elements and graphic elements. Video elements may, for example, be MPEG-4, MOV, WMV, or other format video items. Graphic elements are other, non-video, visual elements such as photographs or other images, shapes, text, and/or other visual elements. Graphic elements may, for example, be JPEG, PNG, GIF, BMP, or other formatted graphic items. Graphic elements may initially be vector graphic items (e.g. SVG or other vector formatted content), though such items are rasterised when included in a video production.

In the present examples, audio elements are content items such sound effects, music tracks, voice-over tracks. Audio elements may, for example, be WAV, MPEG-3, FLAC, or other formatted audio elements. In the present examples audio elements are distinct to audio that is encoded with a video element.

In addition to the actual content elements, the production data for a given production includes element timing data that defines when an element is to be played in the production.

In the present examples, a production dataset includes production metadata, scene data, audio element data, and visual element data.

By way of specific example, a production dataset may be stored in dictionary/key-value pair data type such as:

```
{
  "production": {
    "id": "abc123",
    "name": "My Production",
    "dimensions": {"width": 1920, "height": 1080},
    "audio data": [{audio record 1}, { audio record 2}, ... { audio record n}]
    "scene data": [{scene record 1}, {scene record 2}, ... { scene record n}],
  }
}
```

In this example, the dataset for a given production includes a production identifier (uniquely identifying the production), a production name, and production dimension data (defining a default dimension for the scene(s) of the production).

Audio data for the production is stored in an array of audio records (discussed below), each audio record being in respect of an audio element that has been added to the production.

Scene data for the production is stored in an array of scene records (discussed below), each scene record being in respect of scene that has been added to the production. In the present example, the position of a scene record in the scene data array defines its position in the production (e.g. a scene record at index n appears before a scene record at index n+1). In alternative embodiments scene position/order may be stored as an explicit value in each scene record (or elsewhere).

In this example, each audio record in the audio data array includes the following data:

```
{
  "audio element source": "<content reference>",
  "production start offset": <start offset>,
  "trim": [<start trim point>, <end trim point>],
  "volume": [<volume data>]
}
```

For each audio element, source data provides a reference (e.g. a link, URL, or other pointer) to the actual content of the audio element. The production start offset provides a number of seconds (>=0) that play of the audio element is offset from the start of the production. I.e. if the start_offset is 5.5, the audio element will start playing 5.5 seconds into the production. Trim data provides start and/or end trim points which are relative to the audio element itself and define what portion of the audio element is played in the production. For example, trim data of [3.3, 10] indicates that when the audio element is played in the production it is played from 3.3 seconds into the native (i.e. untrimmed) duration of the audio time to 10 seconds into the native duration of the audio element. Volume data may include a single value (e.g. a float/double) indicating a volume for the entire audio element, or more complex data—for example a series of timing/volume pairs that define how the volume changes over the duration of the audio element.

In this example the play duration and end time of audio elements are not explicitly stored (though could be if desired). The play duration of an audio element can be calculated based on the actual content of the audio element (which will have a native duration) and any trim points defined for the audio element. The end time of an audio element can be calculated by adding the audio element's play duration to its start offset.

In this example, each scene record in the scene data array includes the following data:

```
{
  "duration": "<no. seconds>",
  "outro_transition": {<outro transition data>},
  "animation_style": <data defining animation style>,
  "visual element data": [{element record 1}, ... {element record n}],
}
```

In example scene record above, the duration defines the duration of the scene—e.g. in seconds. The duration may be stored, or may instead be calculated based on visual elements that have been added to the scene. The outro transition provides (or references) data defining an outro transition for the scene. Such a transition may be defined, for example, by a transition style (e.g. fade, slide, or other style), an outro duration (e.g. in seconds), and (if relevant to the style) a direction. The animation style provides data in respect of an animation style associated with the scene and that is applied to visual elements added to the scene (unless an element has an overriding animation style). Animation styles may, for example, operate to cause elements to fade in/out, pop (e.g. go from a 0×0 size to actual size with a bounce at the end), or appear/disappear/behave with any other animation style.

Data in respect of visual elements that have been added to a scene is stored in an array of visual element records (discussed below), each visual element record being in respect of a visual that has been added to the scene. In the present example, the position of a visual record in the visual element data array defines its depth (e.g. z-index) in the scene (e.g. a visual element record at index n appears behind a visual element record at index n+1). In alternative embodiments, element depth may be stored as an explicit value in each visual element record (or elsewhere).

In this example scene start and end times are not explicitly stored (though could be if desired). A given scene's start time can be calculated by adding together the durations of all preceding scenes. A scene's end time can be calculated by adding its duration to its start time.

The present disclosure provides two general approaches to visual elements.

In one approach to visual elements, any visual element that is added to a scene will play (i.e. be displayed) for the duration of that scene: it will start when the scene starts and end when the scene ends. In this embodiment, and by way of example, each visual element record includes the following data:

```
{
   "type": <element type>,
   "position": [<x>, <y>],
   "size": [<height>, <width>],
   "animation_style": <data defining animation style>,
   "element_source": "<content reference>",
   "trim": [<start trim point>, <end trim point>],
   "volume": [<volume data>]
}
```

In this example, the type provides an identifier of the type of element the record relates to e.g. video, image, text, chart/graph, or other type. The position defines an x and y coordinate of an origin of the element on a canvas (described below). Any appropriate coordinate system and origin may be used, for example the origin defining the position (e.g. in pixels) of the top-left corner of the element. The size defines the size of the element—in this case by way of a height value and width value in pixels). The animation style provides animation data if the animation style associated with the scene the element has been added to is to be overridden. The source provides a reference (e.g. a link, URL, or other pointer) to the actual content of the visual element. The trim and volume are relevant to video type elements and provide trim/volume data which are similar to these data items as described above with reference to audio element records.

In this approach, where visual elements associated with a scene are configured to play for the entire scene, image elements added to a scene will play for the entire scene. Video elements that have a play duration (calculated with reference to the video elements' native duration and any trim points) which is less than the duration of the scene the element appears may be automatically looped to play for the scene duration or may be set to play once only. As described below, when a video element is added to a scene having shorter duration than the video element's play duration the scene's duration is lengthened to accommodate the video element.

In the other general approach to visual elements described herein, visual elements added to a scene need not play for the entire duration of that scene. In this case, each visual element record include additional data to that described above to specify when a visual element is played within a scene. For example:

```
{
   ...
   "scene start offset": <start offset>,
   "play duration": <duration>,
   "loop": <loop data>,
   "multi-scene element": <multi scene element identifier>
}
```

In this case the scene start offset provides a number of seconds (>=0) that play of the visual element is offset from the start of the scene it appears in. I.e. if the start offset is 5.5, the visual element will start playing (be displayed) 5.5 seconds into the scene. The play duration defines a duration (e.g. in seconds) that the visual element will play for. In the present example, where an element is associated with a particular scene, the start offset and play duration will not result in the element playing beyond the end of the scene: the element will stop playing at the end of the scene it is in regardless of the visual element's play duration (though, as discussed below, the same visual element may be displayed in a subsequent scene).

Loop data is relevant to video elements and provides a mechanism to define a number of times (>=1) that a video element is to loop within the scene. Once again, in the present example a video cannot loop beyond the end of the scene it has been added to. For video elements, play duration may be defined by either a loop value or a play duration value (in which case the video is set to loop for the play duration).

In this example, the multi-scene element value is used if a graphic element is to be continuously played across multiple scenes (e.g. from a point in scene n through to a point in scene m, m>n). In this case, an element record for the visual element is created and stored in the visual element array of each scene the element appears in. The multi-scene element is assigned a multi scene element identifier (unique for the production) and that same identifier is included in each element record created for the multi-scene element. Where a graphic element is a multi-scene element it may not be subject to any outro transition of a scene if the element appears in the next scene.

In alternative embodiments, rather than being specifically associated with one or more specific scenes, data for a multi-scene graphic element may be stored in a production-level array of multi-scene graphic elements (similar to the audio data described above). In this case a multi scene element may be provided with a list of one or more start/end timing pairs which define (relative to the production as a whole) when the element is displayed (as well as other attributes such as type, size, position, source etc.). For example, an element may be provided with a list of timings such as [(0, 3), (6, 9), (15, 20)] which would indicate that the element is displayed from the start of the production to 3 seconds, from 6 seconds into the production to 9 seconds, and from 15 seconds into the production to 20 seconds. In this case, in order to determine which scene(s) a given multi-scene graphic element is displayed in calculations are performed based on the multi-scene element's start and end time(s).

In this example, a visual element's production start offset (with reference to the production as a whole rather than a particular scene) and end time (either within a scene or within the production as a whole) are not explicitly stored (though could be if desired). A visual element's production start offset can be calculated by adding the visual element's scene start offset to the scene's start time (calculated as discussed above). The scene end time of a visual element (with reference to the scene it is part of) can be calculated by adding its duration to its scene start offset. The production end time of a visual element (with reference to the production as a whole) can be calculated by adding its duration to its production start time.

Where loop data is stored for a video element instead of a duration, the play duration of the video element can be determined by calculating the duration of a single loop (e.g. based on the native duration of the video element and any trim points, as per audio elements described above) and multiplying that by the number of loops.

The below description refers to the single loop play duration of a video element. This is the duration that a video element would play if it did not loop (i.e. if it played once and stopped). The single loop play duration of a video element is calculated based on the video element's native duration and any trim points.

In the examples below reference is made to determining if a visual element is anchored to the end of its scene. This determination is used, for example, when adjusting scene durations. In the present disclosure, a visual element will be determined to be anchored to the end of its scene if plays to the end of the scene. This can be determined in various ways, for example by comparing the scene duration to the visual element's play time end (the play time end determined, for example, with reference to the element's scene start offset and play duration or loop data). In other embodiments, rather than calculating this as needed, a scene end anchor flag/Boolean value can be stored—set, for example, to true of the visual element is anchored to the end of its scene.

Similarly, in some instances determining if a visual element is anchored to the start of its scene is also useful. In this case an element with a scene start offset of 0 is determined to be anchored to the start of its scene.

Lastly, in some instances, determining if a visual element is anchored to its scene (as a whole) is useful. In this case an element that is anchored to both the start and the end of its scene is determined to be anchored to the scene (as a whole). Once again, a separate data item may be flag whether a visual element is anchored to its scene or not.

The above provides an example of data that is relevant to the features and techniques of the present disclosure. A typical video production will include additional data items to those described. By way of example, in addition to size any visual element added to a production may include data such as rotation, transparency, and cropping (defining what portion of the referenced element is visible when the element is cropped). By way of further example, specific types of elements may have attributes/data specific to those types of elements—e.g. text elements may define text attributes (such as font, size, colour, style, alignment, and other text attributes), image elements may define image attributes (such as brightness filters, saturation filters, and other attributes). Many other data items may be provided for.

Figure 2:
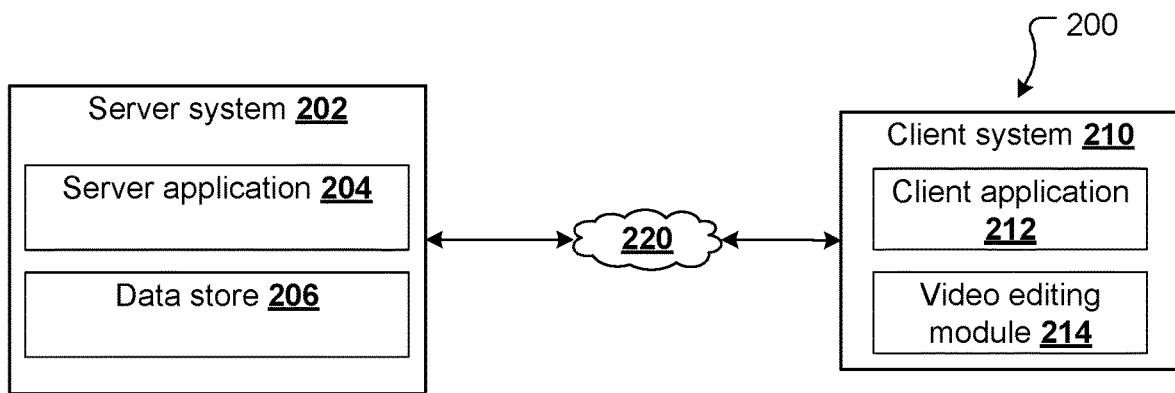
FIG. 2 is a block diagram illustrating an example environment in which features of the present disclosure can be implemented.

FIG. 2 depicts one example of a networked environment 200 in which the various operations and techniques described herein can be performed.

Networked environment 200 includes a video production server system 202 (server system 202 for short) and a client system 210 that are interconnected via a communications network 220 (e.g. the Internet). While a single client system 210 is illustrated and described, server system 202 will typically serve multiple client systems 210.

The video production server system 202 includes various functional components which operate together to provide server side functionality.

One component of server system 202 is a server application 204. The server application 204 is executed by a computer processing system to configure the server system 202 to provide server-side functionality to one or more corresponding client applications (e.g. client application 212 described below). The server-side functionality includes operations such as user account management, login, and production specific functions—for example creating, saving, publishing, and sharing productions.

To provide the server-side functionality, the server application 204 comprises one or more application programs, libraries, APIs or other software elements. For example, where the client application 212 is a web browser, the server application 204 will be a web server such as Apache, IIS, nginx, GWS, or an alternative web server. Where the client application 212 is a native application, the server application 204 will be an application server configured specifically to interact with that client application 212. Server system 202 may be provided with both web server and application server applications.

In the present example, server system 202 also includes a data store 206 which is used to store various data required by the server system 202 in the course of its operations. Such data may include, for example, user account data, production data, video element data, graphic element data, audio element data, and other data in respect of productions that have been created by users. While one data store 206 is depicted, server system 202 may include/make use of multiple separate data stores—e.g. a user data store (storing user account details), one or more element library data stores (storing video, graphic, and audio elements that users can add to video productions being created); a video production data store (storing data in respect of video productions that have been created); and/or other data stores.

In order to provide server side functionality to clients, server system 202 will typically include additional functional components to those illustrated and described. As one example, server system 202 will typically include one or more firewalls (and/or other network security components) and load balancers (for managing access to the server application 204).

The server system 202 components have been described as functional components, and may be implemented by hardware, software (data and computer readable instructions which are stored in memory and executed by one or more computer processing systems), and/or a combination of hardware and software.

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 204 may run on a single dedicated server computer and data store 206 may run on a separate server computer (with access to appropriate data storage resources). As an alternative example, server system 202 may be a cloud computing system and configured to commission/decommission resources based on user demand 204. In this case there may be multiple server computers (nodes) running multiple server applications 204 which service clients via a load balancer.

Client system 210 hosts a client application 212 which, when executed by the client system 210, configures the client system 210 to provide client-side functionality for/interact with the server application 204 of the server system 202. Via the client application 212, a user/designer can interact with the server application 204 in order to perform various operations such as creating, editing, saving, retrieving/accessing, publishing, and sharing video productions.

Client application 212 may be a web browser application (such as Chrome, Safari, Internet Explorer, Opera, or an alternative web browser application) which accesses the server application 204 via an appropriate uniform resource locator (URL) and communicates with server application 204 via general world-wide-web protocols (e.g. http, https, ftp). Alternatively, the client application 212 may be a native application programmed to communicate with server application 204 using defined application programming interface (API) calls.

In the present example, client system 210 also includes a video editing module 214 (VEM 214 for short). As described below, the VEM 214 allows (or configures the client application 212 to allow) a user to create, edit, save, retrieve/access, publish, and share video productions using client system 210. VEM 214 may be a software module such as an add-on or plug-in that operates in conjunction with the client application 212 to expand the functionality thereof. In alternative embodiments, however, the functionality provided by the VEM 214 may be natively provided by the client application 212 (i.e. the client application 212 itself has instructions and data which, when executed, cause the client application 212 to perform part or all of the element grouping functionality described herein).

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example, at least an operating system application such as a Microsoft Windows operating system, an Apple macOS operating system, an Apple iOS operating system, an Android operating system, a Unix or Linux operating system, or an alternative operating system.

The architecture described above and illustrated in FIG. 2 is provided by way of example only, and variations are possible.

For example, while the VEM 214 has been described and illustrated as being part of/installed at the client system 210, the functionality provided by the VEM 214 could alternatively (or additionally) be provided by the server system 202 (for example as an add-on or extension to server application 204, a separate, stand-alone application that communicates with server application 204, or a native part of server application 204).

As a further example, the VEM 214 could be provided as an entirely separate service—e.g. running on a separate server system to server system 202 and communicating with client application 212 (and/or server system 202) as required to perform the element grouping functionality described herein.

As yet a further example, the functionality described herein may be provided by a self-contained application that is installed and runs solely on a client system without any need of a server application.

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
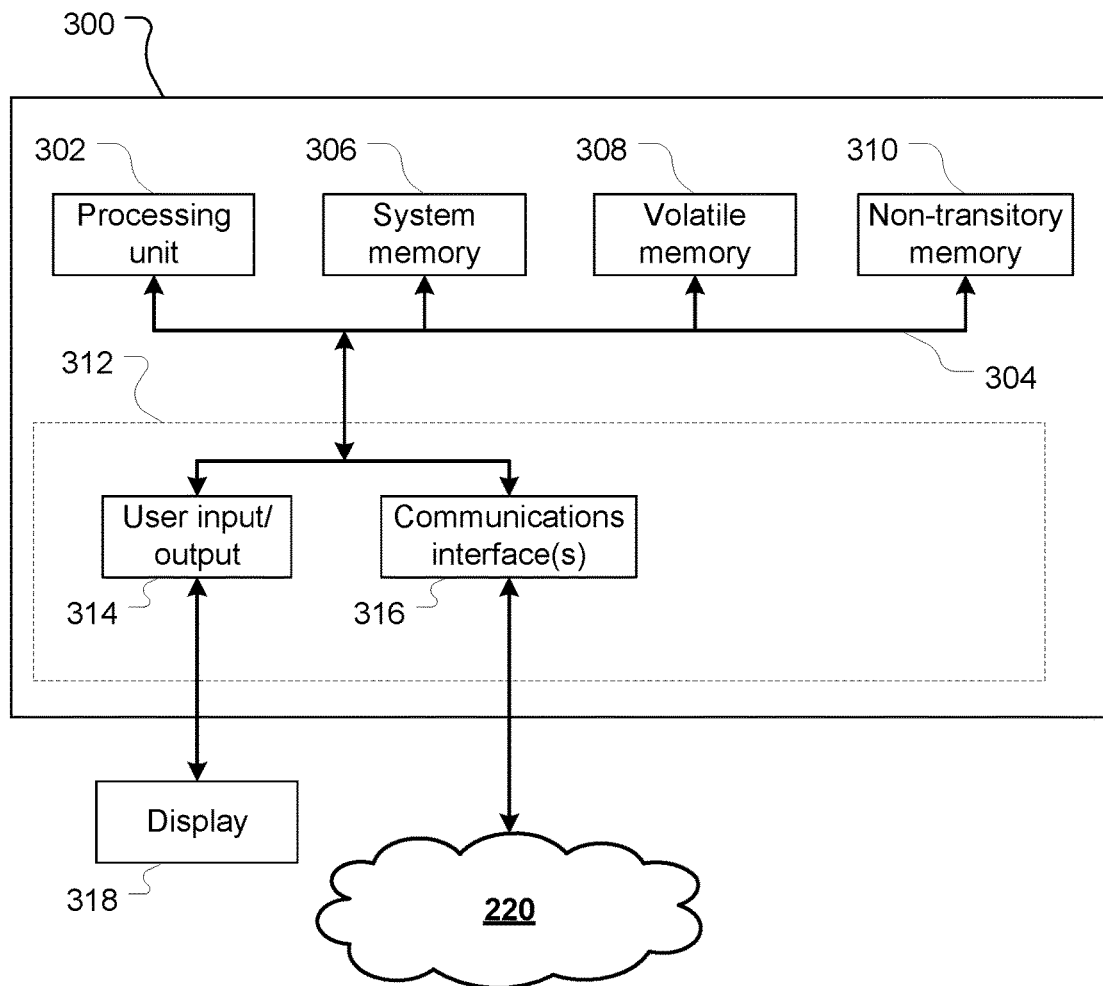
FIG. 3 is an example computer processing system configurable to perform various features described herein.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function, all processing required to perform that operation or function will be performed by processing unit 302. In other instances, processing required to perform that operation or function may also be performed by remote processing devices accessible to and useable by (either in a shared or dedicated manner) system 300.

Through a communications bus 304, the processing unit 302 is in data communication with a one or more machine readable storage (memory) devices which store instructions and/or data for controlling operation of the processing system 300. In this example, system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects— whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as display devices, speakers, vibration modules, LEDs/other lights, and such like. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

In the present embodiments, when system 300 is configured as a client system 210 it will include at least a display 318. Display 318 may be a touch screen display permitting both input (e.g. via touch inputs) and output (by displaying the user interfaces described herein). When configured as a client system 210, system 300 may (and will if display 318 does not permit input) include other input devices—for example a keyboard, pointing device, and/or other input devices.

System 300 also includes one or more communications interfaces 316 for communication with a network, such as network 220 of environment 200 (and/or a local network within the server system 202 or OS). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: client system 210 includes a client application 212 and video editing module 214 which configure the client system 210 to perform the operations described herein.

In some cases, part or all of a given computer-implemented method will be performed by system 300 itself, while in other cases processing may be performed by other devices in data communication with system 300.

The below describes computer implemented methods and user interfaces for creating and editing digital video productions. The processing described below is described as being performed by a video editing module (VEM) 214. As described above, however, processing may be performed by the VEM 214 alone, by the VEM 214 in conjunction with a client application (e.g. 212), or by the VEM 214 in conjunction with other applications (running on client system 210 or an alternative system such as server system 202).

In the below the VEM 214 is described as displaying (or causing display) of data/user interfaces/user interface elements and receiving user inputs. Display of data/UIs/UI elements is on one or more displays that are connected to or part of client system 210. Similarly, VEM 214 receives/ detects user inputs via one or more user input device(s) that are connected to or part of client system 210. In one example, the client system 210 includes (or is connected to) a touch screen display 318 which both displays data and receives input (in the form of contacts and/or gestures made with respect to the touch screen display).

During processing the VEM 214 is configured to access and store production data. In the present example, the VEM 214 stores production data at a server system (e.g. 202). In this case, in order to store production data the VEM 214 communicates the relevant data to server application 204 which, in turn, causes the data to be stored in data store 206. The VEM 214 may alternatively (or additionally) store production data in local memory of the client system 210, for example non-transitory memory 310. In this case storing production data involves writing it to that memory. In some cases VEM 214 may be configured to initially store production data in local memory and only communicate production data to the server system 202 at certain times (e.g. automatically at defined intervals and/or manually as initiated by a user initiating a save operation).

Figure 4:
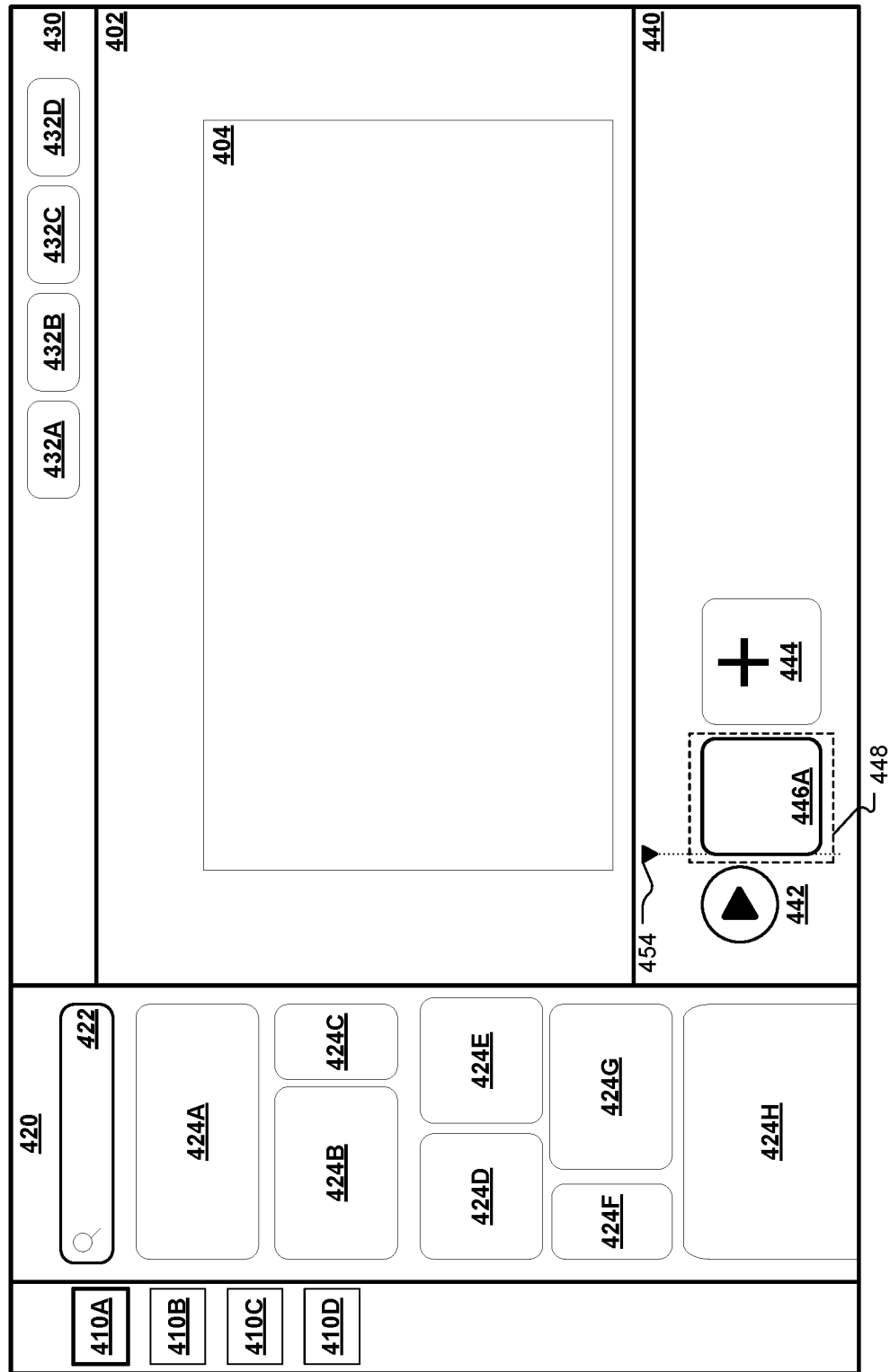
FIG. 4 depicts an example digital video production user interface.

Turning to FIG. 4, one example of a digital video production user interface 400 is provided. Alternative user interfaces are possible.

UI 400 is displayed at a client system 210 display by, in this example by the VEM 214. It includes a design region 402, element type selection controls 410, a search region 420, additional controls 430, and a timeline region 440.

The design region 402 displays a canvas 404 that corresponds to a particular position (time) in the video production. The particular time that the canvas 404 corresponds to is indicated by a playhead 454 which is displayed in the timeline region 440. In the embodiment illustrated by FIG. 4, canvas 404 corresponds to the playback position that is at the start of a scene of the video production represented by scene preview 446A (discussed below).

The element type selection controls 410 determine the type of elements that are displayed in the search region 420 (discussed below). In this example, the video production user interface 400 has four element type selection controls: video element control 410A, image element control 410B, text element control 410C, and audio element control 410D.

An element type selection control 410 may be activated via a user selecting (or activating) the element type selection control 410 (e.g. by clicking one the element type selection control 410 using a mouse operatively coupled to the client system 210 or by touch the element type selection control on a touch screen operatively coupled to the client system 210). In this example the activated element type selection control 410 is visually distinguished from the non-activated element type selection controls 410 by having a heavier weight outline. As described below, alternative mechanisms for visually distinguishing the selected element type selection control are possible.

Although only four element type selection controls 410 are illustrated in FIG. 4, the video production user interface 400 may include additional, alternative, or fewer element type selection controls. For example, the video production user interface 400 may include an element type selection control that allows a user to browse for elements (e.g. video, graphic, and/or audio elements) in a data store of the client system 210 (e.g. internal memory of a client's computer) and/or a data store operatively coupled to the client system 210 (e.g. a memory storage device physically or wirelessly coupled to the client's computer).

The search region 420 has a search box 422 in which a user can enter text/search terms (e.g. via an input device operatively coupled to the client system 210) in order to search for design elements (e.g. video, graphic, and/or audio). Based on the activated element type selection control 410, search result thumbnails 424 satisfying the user's search query are displayed in the search region 420. For example, if the video element type selection control 410A is selected, the search is performed across video elements accessible to the VEM 214 (for example video elements locally stored at the client system 210, video elements stored/made accessible via server system 202, and/or video elements stored at a third party system accessible over network 220) and the result thumbnails 424 will be limited to video elements that satisfy the user's search. Similarly, if the image, text, or audio element type selection controls 410B-D are selected, the search performed across relevant sources, and result thumbnails 424 will be limited to images, text, or audio elements that satisfy the user's search, respectively.

In some embodiments, if no element type selection control 410 is selected the search is performed across all element types.

In the example illustrated in FIG. 4, seven search results 424A-G are fully displayed in the search region 420 and one search result 424H is partially displayed in the search region 420. It will be appreciated by that there may be many search results 424 that satisfy the user's search query and that not all of the search results 424 can be displayed simultaneously in the search region 420. Accordingly, a user can scroll through the search results 424 within the search region 420 in order to cause additional search results to be displayed in the search region 420. For example, the user may scroll through the search results 424 using a mouse operatively coupled to the client system 210 or by interacting with a touch screen operatively coupled to the client system 210.

A user may add a design element (e.g. video, text, or image) to a scene of the video production they are creating by dragging one of the search result thumbnails 424 from the search region 420 and dropping it onto the canvas 404. Other methods may be used to add a design element to a scene. Adding a design element to a scene is more detail discussed below.

The additional controls 430 allow a user to edit and/or adjust characteristics of a selected design element (e.g. an element that is displayed on canvas 404 and has been selected by a user). In the example illustrated in FIG. 4, the video production user interface 400 has four additional controls 430A-D (though may have additional or fewer additional controls 430).

The additional controls 430 may be adaptive and change based on the type of design element selected within the canvas 404. For example, if a text element on canvas 404 has been selected, the additional controls 430 may include a font type selection control, a font size selection control, and a font colour control. In contrast, if a shape element on canvas 404 has been selected (e.g. a rectangle or the like), the additional controls 430 may include a line control for adjusting line options and a fill control for adjusting fill options. Additional or fewer additional controls 430 may be displayed depending on the type of design element selected in the canvas.

Additional controls 430 may be permanently displayed. For example, control 432D may be a permanently displayed 'publish' control which a user can activate to publish, share, or save the production currently being worked on. As another example, a particular control (e.g. 432C) may be a toggle control allowing a user to display or hide an audio timeline as described below.

The timeline region 440 is used to display scene previews 446 that correspond to scenes of the production being created/edited by the user. Each scene of the production has a corresponding scene preview 446. In the present embodiments, when a particular scene has been selected (e.g. by selection of a particular scene preview) the current play position within the production (indicated by playhead 454) is set to the start of the selected scene and a canvas 404 corresponding to the current play position is displayed in the design region 402. In the present example, the dimensions of each scene of a production (and, therefore, canvas 404) are defined by the dimensions of the production itself (stored in the production data). In order to edit a production a user may add elements to canvas 404, delete elements from canvas 404, or select elements from canvas 404 and edit them (e.g. by changing their spatial position on the canvas, their size, and/or any other relevant attributes associated with an element).

In the present example, the timeline region 440 also has a play control 442 and an add scene control 444.

Activation of the play control 442 by a user causes the video production to play from the position (time) indicated by the playhead 454 (e.g. on canvas 404). Once the play control 442 has been activated, it turns into a pause control, which when activated causes the video production to pause playback. When the video production is playing, a progress indicator is displayed in the timeline region 440 indicating the current play position of the video production. The progress indicator may be playhead 454. A user may be able to interact with the playhead 454 (via the client application 212 on client device 210) to move the playhead 454 and, therefore, playback of the video production to a particular time in the video production.

Activation of the add scene control 444 by a user causes a scene to be added to the video production being produced and causes a scene preview 446 corresponding to the newly added scene to be added to the timeline region 440. In the present embodiments, when a new scene is added playhead 454 moved so as to align with the start of the newly added scene.

In the example illustrated in FIG. 4, the scene corresponding to scene preview 446A has been selected (e.g. by selection of scene preview 446A or an alternative selection means). Accordingly, the playhead 454 (which indicates the current play position in the production) has been positioned at the start of scene preview 446A and the canvas 404 corresponds to the production at that point. Canvas 404 is blank because no design elements have yet been added to the scene/production at that play position. Adding scenes and design elements to scenes is discussed below.

Figure 5:
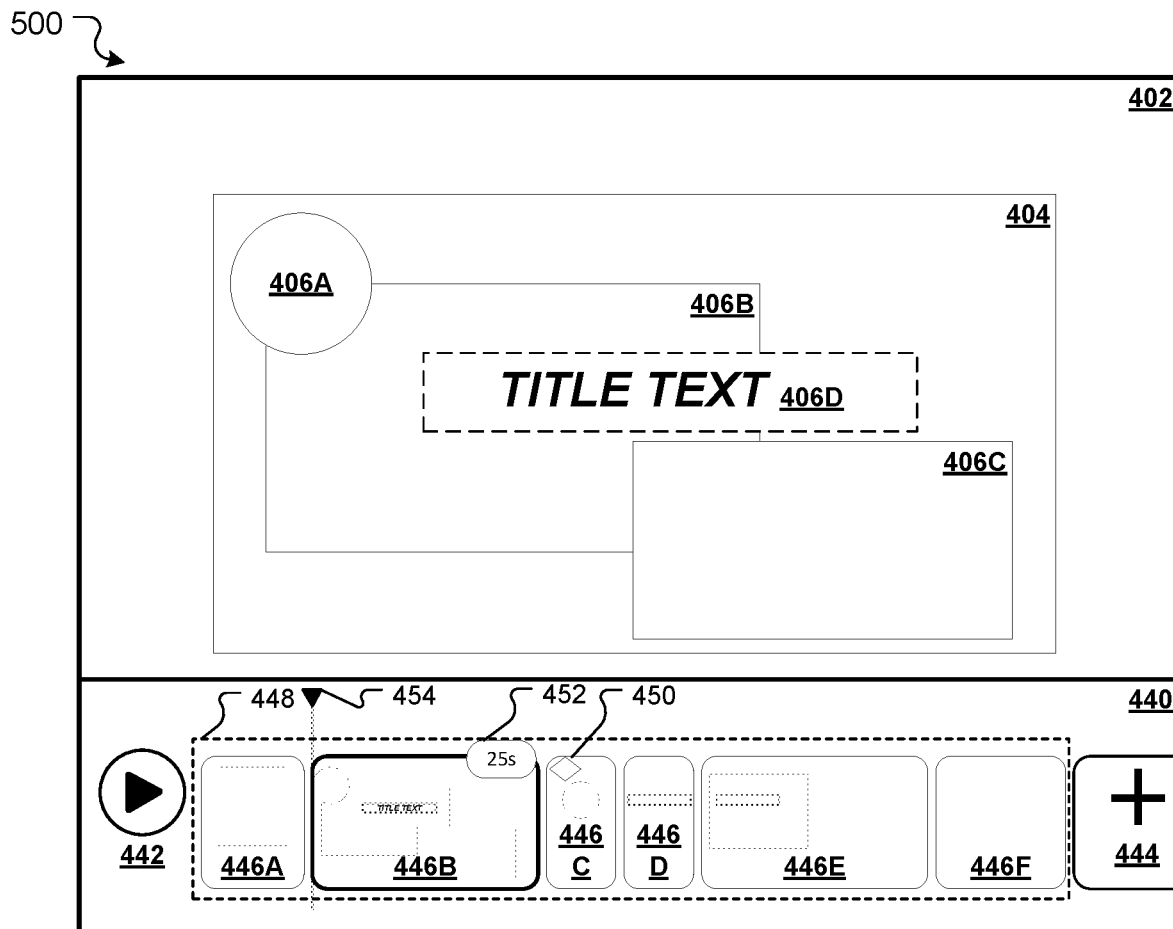
FIG. 5 depicts an example digital video production user interface.

FIG. 5 provides a partial version 500 of UI 400 of FIG. 4 (with only the design region 402 and timeline region 440 depicted). UI 500 illustrates a video production having six scenes, each represented by respective scene preview 446A-F. As can be seen in the timeline region 440, the scene previews 446 are arranged linearly from left to right to form a single-layered scene timeline 448. In the example of FIG. 5, scene previews 446 are separated from one another by a separation gap. In certain embodiments, if a scene transition is defined between scenes an icon or other graphic representing the transition is displayed in the separation gap between those scenes. The order of the scene previews 446 within the scene timeline 448 indicates the play order of the corresponding scenes in the video production, with (in this example) scenes to the left playing earlier in the video production than scenes to the right. Adding and adjusting scenes in a video production is discussed below.

In the present embodiment, each scene preview 446 also provides a preview of the scene it corresponds to. As can be seen in FIG. 5, scene preview 446B provides a preview of the visual elements that have been added to the scene (and are also displayed on the canvas 404).

It will be appreciated that for some video productions the scene timeline 448 may include too many scenes for all scene previews 446 to be simultaneously displayed in the timeline region 440. In this case, a user may scroll through the scene timeline 448. For example, a user may scroll through the timeline in one direction (in this case the right) in order to display scene previews 446 for scenes occurring later in the video production or in the other direction (in this case the left) in order to display scene previews 446 for scenes occurring earlier in the video production. For example, the user may scroll left and right through the timeline 448 by dragging or swiping the timeline right and left, respectively. As an example, the user may drag the timeline 448 via a mouse operatively coupled to the client system 210 or swipe the timeline 448 by interacting with a touch screen operatively coupled to the client system 210.

In the example illustrated in FIG. 5, scene preview 446B is selected. In response to scene preview 446B being selected, VEM 214 causes the playhead 454 to align with the start of scene 446B. Accordingly, canvas 404 displays the elements that are displayed at that playback position.

In FIG. 5, canvas 404 displays four design elements 406A-D: graphic element 406A (in this example a circle containing an image); video element 406B, video element 406C, and graphic element 406D (in this case a text element with the text "TITLE TEXT"). Each of the design elements 406A-D are displayed at a specific spatial position on the canvas 404, for example as arranged by a user creating the video production. A user may change the spatial position of a design element 406 within canvas 404, for example by selecting and dragging the design element 406 to the desired position within the canvas 404.

The selected scene preview is visually distinguished from the non-selected scene previews 446. In FIG. 5, as scene preview 446B is selected, it is visually distinguished from the other non-selected scene previews 446 by having a heavier weight outline. As described below, alternative mechanisms for visually distinguishing the selected scene preview 446 are possible.

Each scene preview 446 has a start edge (in this case the left edge) and an end edge (in this case the right edge). The distance between a scene preview's start and end edges define a display width which is based (in part) on the duration of the corresponding scene. This provides a visual indication of the approximate duration of the corresponding scene in the video production. For example, the display width of a scene preview 446 provides an indication of the play length of its corresponding scene in seconds.

In the present embodiments, the VEM 214 is configured to calculate the display width of a given scene preview 446 based on the duration of the scene and with reference to a minimum display duration. In the present example, the minimum display duration is 1 second, though alternative minimum display durations could be used.

If the VEM 214 determines that the duration of a scene is greater than or equal to the minimum display duration the VEM 214 calculates the display width for the scene's preview 446 based on the scene's duration. In one particular embodiment, the VEM 214 calculates the display width of such a scene's preview 446 (in pixels) to be the duration of the scene (in seconds)*24 pixels.

Conversely, if the VEM 214 determines that the duration of a scene is less than the minimum display duration, the VEM 214 uses a minimum display width for the scene's preview 446. In one example the minimum display width is 24 pixels.

Calculating a scene preview's display width in this way means that a very short scene (e.g. less than 1 second) will have a scene preview 446 that is still large enough for a user to easily see and interact with in the scene timeline 448.

As an example, in FIG. 5, the scene corresponding to scene preview 446D may have a duration that corresponds to the minimum display duration and the scene corresponding to scene preview 446C may have a duration that is shorter than the minimum display duration. However, both scene previews 446C-D have the same display width (e.g. 24 pixels). In this example, the VEM 214 has displayed scene preview 446C to include what will be referred to as a short scene indicator 450. The short scene indicator 450 is displayed to visually indicate that the scene corresponding to scene preview 446C has a shorter duration than is visually indicated by the display width of the scene preview 446C. VEM 214 may be configured to permanently display the short scene indicator, or to dynamically display the short scene indicator 450 in response to user interaction (for example hovering over/contacting a short scene such as 446C).

In addition, on detecting selection of a shortened scene preview such as 446C, VEM 214 may be configured to temporarily display the scene preview at a length indicative of the scene's actual duration. For example, if scene preview 446C corresponded to a scene of 0.5 seconds (and VEM 214 was configured to use a display length of 24 pixels per second), the VEM 214 could temporarily display scene preview 446C with a display width of 12 pixels on detecting selection of the scene preview 446C. The VEM 214 may then re-display the scene preview at the minimum display width.

The VEM 214 may be further configured to display the actual duration of a given scene. For example, on detecting a user hovering over (or otherwise interacting with) a scene preview 446, the VEM 214 may display a scene duration popup 452 in which the duration of the scene (e.g. in seconds) is displayed.

The distance between the left and right edges of a scene preview 446, therefore, indicates the duration of a scene corresponding to the scene preview 446.

Figure 6:
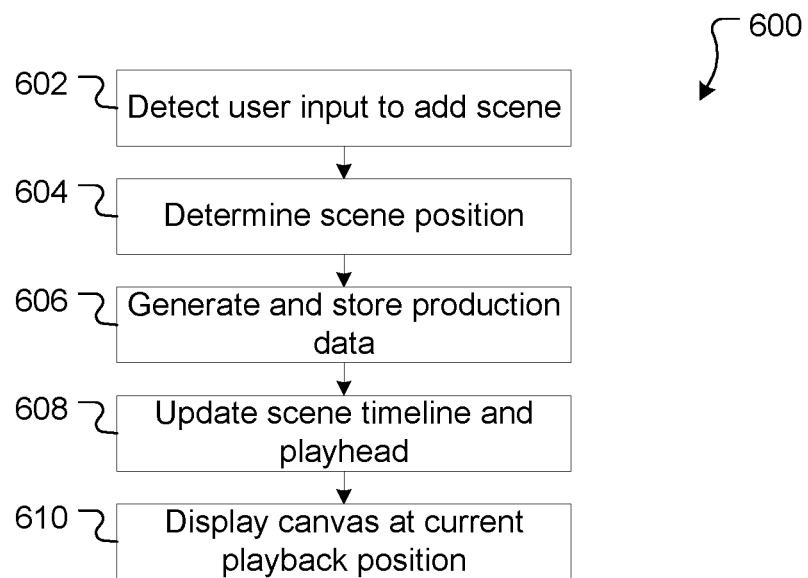
FIG. 6 is a flowchart depicting operations involved in adding a scene to a digital video production.

Turning to FIG. 6, a scene addition process 600 for adding a scene to a production will be described.

At 602, the VEM 214 detects user input to add a scene to a production.

By way of example, and referring to FIG. 4, user input to add a scene to a production may be activation of an add scene control 444. Activation of the add scene control causes a new scene to be added.

Alternative user inputs to add a scene to a production are, however, possible. These include, for example, keyboard shortcuts, menu-driven interactions, and/or alternative interactions provided by UI 400. Furthermore, alternative add scene interactions may allow for a scene to be inserted at a particular place in the production—e.g. as the first scene of the production or before (or after) an existing scene of the production.

At 604, in response to detecting user input to add a scene to a production, the VEM 214 determines the position of the scene in the scene order. This determination will be based on the user input to add the scene and many options exist. For example, if the add scene control 444 is activated VEM 214 may be configured to add the new scene to the end of the production (i.e. as the last scene). In contrast, if a user performs a secondary interaction with a particular scene preview (e.g. a right click, dwell gesture, or other interaction) a menu providing an 'insert scene after current scene' and/or 'insert scene before current scene' option may be displayed. In this case, and depending on the option selected by user input, the VEM 214 may be configured to add the new scene immediately after the currently selected scene or immediately before the currently selected scene. Further alternatively, activation of the add scene control 444 may cause a menu or other UI element to be displayed prompting the user to select a particular position for the scene (e.g. by number or other reference). Still further alternatives are possible.

At 606, the VEM 214 generates and stores production data in respect of the new scene.

The production data generated for the new scene will depend on implementation. In the context of the example production data described above, however, generating production data includes creating a new scene record and adding it to the scene data array. On creation of a new scene, the VEM 214 is configured to set a default duration (e.g. 5 seconds or any other default duration). Outro_transition and animation_style are not generated/stored at this stage (though VEM 214 could provide default values for these also). If no visual elements have yet been added to the scene the visual element array is empty.

In some implementations, the VEM 114 is configured to determine if the new scene interrupts any multi-scene elements. For example, if a new scene is being inserted between scenes n and n+1, the VEM 114 determines if any particular multi-scene element is played across those scenes—e.g. is played at the end of scene n and at the start of scene n+1. This determination may be made with reference to a multi-scene element identifier and/or the play times of a multi-scene element as described above. If any particular multi-scene element is displayed across the scene boundary the VEM 114 determines that multi-scene element to be interrupted by the newly added scene. Where VEM 114 determines that a multi-scene element is interrupted by a newly added scene various options are possible. For example, the VEM 114 may be configured to automatically add the multi-scene element to the new scene (i.e. so it plays for the duration of the new scene). Alternatively, the VEM 114 may generate a prompt alerting a user to the interrupted element and request input confirming (or otherwise) that the element should be added to the new scene. Where a multi-scene element is interrupted and added to a new scene, the VEM 114 creates relevant data for the multi-scene element (e.g. a visual element record) and stores this with the production data (e.g. in the scene's visual element array).

In the present example, scene order is implicitly maintained by the position of the scene record in the scene data array. Accordingly, when storing the scene record at 606 the VEM 214 inserts the scene record into the scene array at the relevant position (as determined at 604). For example: if the scene's position is the start of the production the scene record is inserted at the start of the scene array (index 0); if the scene's position is the end of the production the scene record is appended to the end of the scene array; if the scene's position is after (or before) an existing scene, the scene's is added to the array after (or before) that scene. If scene order data is explicitly maintained, the VEM 214 explicitly records the scene order in an appropriate data field at 606 (and, if necessary, updates the order data of any scenes that occur after the newly added scene).

As noted above, in the present example the VEM 214 causes the production data generated to be stored at server system 202 by communicating it to the server application 204. The VEM 214 may alternatively (or additionally) store the production data in local memory of the client system 210.

At 608, the VEM 214 updates the scene timeline 448 to account for the new scene. This involves generating and displaying a scene preview 446 for the new scene. The VEM 214 displays the scene preview 446 in the timeline region 440, the scene preview's order in the scene timeline 448 based on its order in the production. As described above, the scene preview 446 has a display length. In the present example, where the default duration of a newly created scene is 5 seconds (which is greater than the minimum display duration) and the VEM 214 is configured to calculate a preview's display width as duration*24 pixels, the new scene preview 446 will have a width of 120 pixels. In addition, the VEM 214 updates the position of the playhead 454 to align with the start of the new scene that has been added.

In the present example, the VEM 214 is configured to automatically select the newly added scene. Accordingly, at 608 the VEM 214 also visually distinguishes the scene preview 446 of the new scene from any other scenes in the production (e.g. by a heavier weight bounding box or alternative mechanism).

At 610, the VEM 114 also updates display of the canvas 404 (given the playhead 454 has been moved to the start of the newly added scene). In this particular example, the canvas 404 is initially blank (as no elements have been added to the scene). Where one or more multi-scene elements are determined to be interrupted and are added to the new scene these will be displayed in the canvas 404.

Once scenes have been added to a video production the order of scenes in the production can be adjusted.

The VEM 214 reorders a productions scenes on detecting a scene reordering input.

By way of example, a reordering input may be user input to rearrange scene previews 446 in the scene timeline 448—for example user input that selects a particular scene and drags it to a new location in the scene timeline 448. As a further example, reordering input may be via user input that navigates a menu structure and selects a menu item that moves a particular (e.g. the currently selected) scene: to the start of the production; to the end of the production; to a particular position in the scene order (e.g. to a position after a particular scene, before a particular scene, or an otherwise specified location in the scene order). Other reordering inputs are possible.

When the VEM 214 receives a scene reordering input it determines the new position of the scene. This may be determined, for example, based on where the scene is dropped in the scene timeline 448.

In the present example, where scene order is implicitly maintained by a scene's position in the scene array, the VEM 214 updates the position of the scene (and, effectively, all other affected scenes) by moving the scene record to the new position in the scene array.

In addition, when scenes are reordered the VEM 214 updates the scene previews 446 in the scene timeline 448 to reflect their new positions. In the present embodiments, if the playhead 454 is positioned to indicate a time at the start of (or within) a scene that is moved in the reordering, the VEM 214 moves the playhead 454 so that it maintains its scene-relative position in the move. I.e. if the playhead is positioned 5 seconds into scene n and as a result of reordering scene n becomes scene m, the VEM 214 will move the playhead so that it is positioned 5 seconds into scene m.

In some implementations, changing a scene's position in the scene order does not impact any audio elements that have been added to the production.

In other implementations, when a scene's order position is changed the VEM 214 is configured to determine whether any audio elements of the production are associated with any scenes that are impacted by the reordering. Scenes impacted by a reordering are scene that is being reordered itself and any scenes that are subsequent to that scene once in its new position.

In the present example, the VEM 214 determines whether an audio element is associated with a scene by comparing the start time of the audio element to the start time of the scene in question and the end time of the audio element to the end time of the scene in question. If the scene and audio element start times match (or are within a defined tolerance) and the scene and audio element end times match (or are within a defined tolerance) the VEM 214 determines that the audio element is associated with the scene in question. The defined tolerance may, for example, be 0.25 seconds or an alternative value.

If the VEM 214 determines that an audio element is associated with a scene that is impacted by the reordering various processing may be performed. In one embodiment, the VEM 214 may be configured to update any audio element that is associated with a scene that is impacted by a scene reordering operation. In the present example this involves calculating and storing a new start offset value for the audio element (the new start offset calculated, for example, to be the new start time of the associated scene). In this case the VEM 214 may be further configured to alert the user when an audio element is moved (and provide a mechanism for the user to undo the move).

Alternatively, on determining that an audio element is associated with a scene that is impacted by a reordering operation, the VEM 214 may display an alert to the user to inform them of this and provide the user with options such as moving the audio element with the associated scene, leaving the audio element in its current position, abandoning the scene reordering operation.

Once a scene has been created, the VEM 214 is configured to adjust the scene's duration on certain events occurring.

For example, the start and end edges of a scene's preview 446 may be (or be provided or associated with) manipulable UI elements, and as such provide a scene start time adjustment control and a scene end time adjustment control respectively. In this case, user input dragging the end edge of a scene's preview 446 (in the present examples the right edge) in a first direction (in the present examples to the left) causes the VEM 214 to shorten the scene's duration. Conversely, user input dragging the end edge of a scene's preview 446 in a second direction (in the present examples to the right) causes the VEM 214 to lengthen the scene's duration. In the present implementation, the amount by which movement of a scene preview's edge shortens or lengthens the scene's duration is proportional to the distance the edge is dragged. For example, and where 24 pixels is equal to one second, the duration adjustment (in seconds) can be calculated as the horizontal drag distance divided by 24.

Where a scene that has a duration that is less than the minimum display duration (e.g. less than one second) is being adjusted by input dragging a start/end time adjustment control the VEM 214 may be configured to display the scene's preview 446 at a width reflecting its actual duration and allow for adjustment (e.g. by dragging the scene's start or end edge) from that display width. Alternatively, the VEM 214 may be configured to maintain display of the scene's preview 446 at the minimum display width (e.g. 24 pixels) and allow for adjustment from that displayed width (even though it does not truly represent the duration of the scene). Once the adjustment is complete the VEM 214 may either snap the display width of the scene preview 446 back to a display width reflecting the scene's actual duration (if the adjusted duration is greater than the minimum display duration) or back to the minimum display width (if the adjusted duration is less than the minimum display duration).

Alternatively, a scene may be lengthened or shortened by entering a desired scene duration (e.g. seconds) in a text or other input box displayed by VEM 214. In this case the scene is lengthened or shortened to the duration entered.

By way of further example, and as discussed below, a scene's duration may be automatically adjusted when a new video element is added to a scene (which may cause the scene duration to be lengthened), deleted from a scene (which may cause the scene duration to be shortened), and/or a video element timing adjustment is made (which may cause the scene duration to be lengthened or shortened).

In the present embodiment, on detecting that a scene's duration is to be adjusted the VEM 214 determines if any elements are adversely impacted by the adjustment and if any action is required. This may involve various determinations, examples of which are provided below. If the VEM 214 determines that an element is adversely impacted it may be configured to take various actions.

For example, the VEM 214 may be configured to determine if an adjustment to shorten a scene duration would result in the truncation of any video element that is not anchored to the end of the scene (as described above), or is anchored to the end of the scene without being set to loop. To determine this, the VEM 214 calculates a scene-relative end time for each non-anchored, non-looping video element within the scene (i.e. the number of seconds after the scene starts that the video element will end, calculated based on any start offset and trim points) and then determines whether the scene's adjusted duration is less than the video element's scene-relative end time. If so, the scene will not be long enough to play the video. For example, if a non-anchored video element's scene-relative end time is 12 seconds, and the adjusted scene duration is 10 seconds, the scene is not long enough to play the video.

In this case, the VEM 214 may make the scene duration adjustment (effectively trimming the effected video element(s)) and alert the user to this; alert the user to the adverse impact and request user input to confirm (or otherwise) that the adjustment should be made; prevent the adjustment being made until the user addresses the issue (e.g. by trimming or deleting the effected video element(s)).

The VEM 214 may also (or alternatively) be configured to determine if an adjustment to shorten a scene's duration would result in a visual element not being displayed (or being displayed for less than a minimum display duration). The VEM 214 may determine this based on the adjusted scene duration and a visual element's start offset. If the new scene duration minus the visual element's scene start offset is less than a minimum display duration (e.g. 0.1 seconds or another defined value) the VEM 214 may take action. For example, if a scene's new duration is 10 seconds, a visual element's start offset is 10 seconds, and the defined minimum display duration is 0.1 seconds, then (10 seconds–10=0 seconds, which is less than the minimum display duration). As with above, the VEM 214 may alert the user to any such elements and seek confirmation (or otherwise) of whether the scene duration should be adjusted or prevent the adjustment.

As a further example, in certain embodiments the VEM 214 is configured to determine whether any audio elements are associated with the scene whose duration is being changed (e.g. as described above). If so, the VEM 214 may generate an alert to notify the user that they may wish to consider adjusting one or more audio elements that have been identified as being associated with the scene. Such an alert may be generated after the scene's duration has been changed (and the associated audio element(s) highlighted in the user interface) or before, providing the user with an opportunity to abandon the adjustment.

When a scene's duration is lengthened the VEM 214 may also (or alternatively) be configured to determine if any visual elements are anchored to the end of the scene (as described above). If so the VEM 214 may be configured to automatically lengthen such visual elements to play to the new end of the scene, or to display an alert and request input confirming (or otherwise) whether the visual element(s) in question should be left as they are or should be extended.

Once any impacted elements have been identified (and further changes made), VEM 214 adjusts the scene duration. In this example this involves recording the new duration in the scene record.

In some implementations, when a scene's duration is lengthened or shortened the VEM 214 determines if any downstream scenes in the production (i.e. scenes occurring after the scene that has been adjusted) have associated audio elements (determined as described above). If so the VEM 214 may automatically adjust each audio element that is associated with an impacted scene so that it starts at the same time as its associated scene (e.g. by updating the audio element's start offset). In other implementations the VEM may not identify (or alter) associated audio elements, or may identify such audio elements and request user input to confirm (or otherwise) that the audio elements should be updated so as to remain with their potentially associated scenes.

Figure 7:
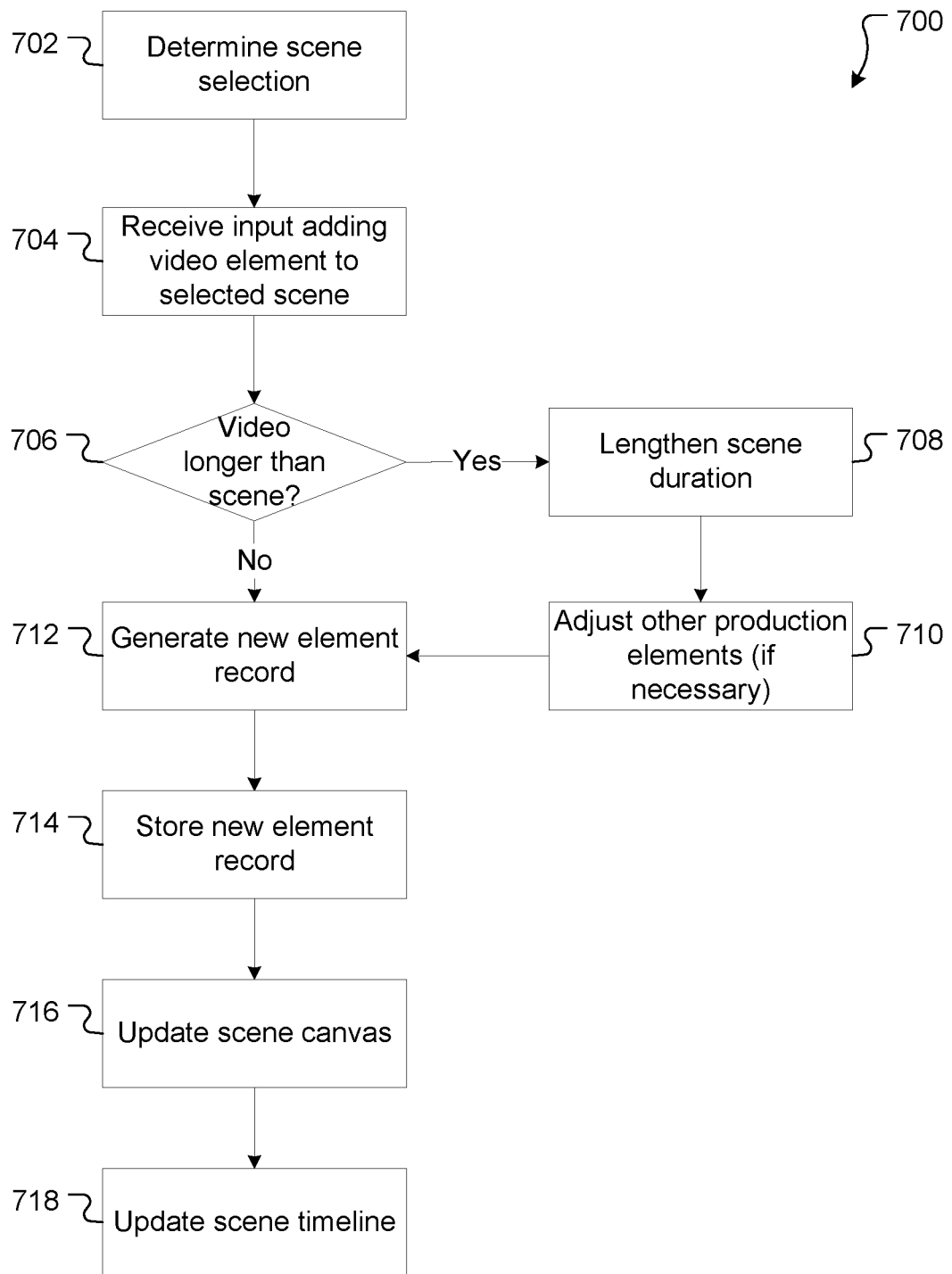
FIG. 7 is a flowchart depicting operations involved in adding a video element to a digital video production.

Turning to FIG. 7, a video element addition process 700 will be described.

At 702, the VEM 214 determines that a particular scene of the production has been selected. This may, for example, be on detecting user input selecting a scene preview 446 or alternative user input. Selection of a particular scene causes the VEM 214 to align the playhead 454 with the start of the selected scene's preview 446 and to display the canvas 404 at the corresponding time (i.e. the start of the selected scene). Alternatively, a particular scene may be selected by user input dragging the playhead 454 to be within (or at the start of) a given scene preview 446.

At 704, the VEM 214 receives user input to add a video element to the selected scene. This may, for example, be user input dragging a video element from search region 420 to the canvas 404 corresponding to the selected scene. Alternative user inputs to add a video element to the selected scene are possible. As one example, a secondary activation of a video element (such as a right click or dwell gesture) may cause a menu to be displayed, the menu including an 'add element to scene' control.

At 706, the VEM 214 determines if a single loop play duration of the video element is longer than the duration of the selected scene. If so processing proceeds to 708. If not, processing proceeds to 712.

At 708, the single loop play duration of the video element being added is longer than the duration of the selected scene. In the present embodiment, the VEM 214 automatically lengthens the scene duration (e.g. by recording a new duration in the scene record) to match the single loop play duration of the video element being added. Processing then proceeds to 710. In other embodiments the VEM 214 may instead alert the user that the video element is longer than the scene and request user input confirming (or otherwise) that the scene should be lengthened.

Where the scene duration is lengthened, this may have an impact on other visual elements of the scene and/or audio elements of the production. At 710, therefore, the VEM 214 determines such elements and performs relevant actions (for example as described above with respect to adjusting a scene's duration).

At 712, the VEM 214 generates element data in respect of the new video element. In the present example this involves generating a new element record.

The type for the element record takes a value corresponding to video elements.

The spatial position for the new video element may take a default position (e.g. centered on the canvas 404) or a position based on the user input adding the element (e.g. centered on a position at which the user dropped the element, or the position closest thereto if that position would leave the element partially off-canvas). This can be adjusted by the user at a later time, e.g. by entry of origin coordinates and/or dragging the element to a new position on the canvas 404.

The size of the element will be the native size of the new video element. This can be adjusted by the user at a later time, e.g. by entry of a size/scaling factor and/or interaction with the UI to manipulate a bounding box of the element.

The element source will provide a reference to the video element.

The animation style, trim data, and volume data are initially set to null (or other default values). These attributes can be adjusted by a user at a later time (e.g. by selecting the element and using controls such as 432 or other controls to do so).

In some embodiments, the VEM 214 is configured to automatically loop any video element so that it plays for the length of the scene it is being added to (the exception being the longest video element which defines the length of the scene and is not automatically looped).

In other embodiments a user may specify the video element's play duration. In this case, when a video element is added to a scene the VEM 214 automatically sets the start offset for the video element to 0 (i.e. so the video element will start at the start of the scene). The VEM 214 may then prompt for user input as to whether the video should loop for the duration of the scene, loop a set number of times (or for a set duration), or not loop. The VEM 214 can then set the start offset, play duration, and/or loop data of the element record accordingly. The new element's timing (e.g. start offset, play duration, loop, and/or scene anchor values) may be adjusted by a user at a later time.

At 714, the VEM 214 causes the element data generated at 710 to be stored (e.g. at server system 202 and/or locally as described above).

At 716, the VEM 214 updates the canvas 404 by displaying a representation of the new video element on the canvas 404. The VEM 214 displays the representation of the video element according to the data (e.g. position and size) determined at 712.

At 718, the VEM 214 updates the scene timeline 448. In the present embodiment this involves updating the preview 446 of the selected scene. To do so the VEM 214 displays a representation of the new video element in the scene preview 446 (for example as depicted in scene preview 446B of FIG. 5). This may be a smaller (and lower resolution) version of the representation added to the canvas at 716, an outline of the representation added to the canvas 404 at 716, or an alternative representation of the element. If the video element does not play for the entire duration of the scene, a partial-scene element indicator (e.g. an icon, badge, text, or other indicator) may be displayed with the video element representation so a user can see that the element does not play for the entire scene.

If the duration of the scene has been changed at 708, the VEM 214 also updates the scene preview 446 at 718 so its display length matches the scene's new duration. This may be an animated effect in which the scene's preview 446 extends (to the right in this example), and pushes any screen previews 446 representing later scenes to the right (and potentially off-screen).

Figure 8:
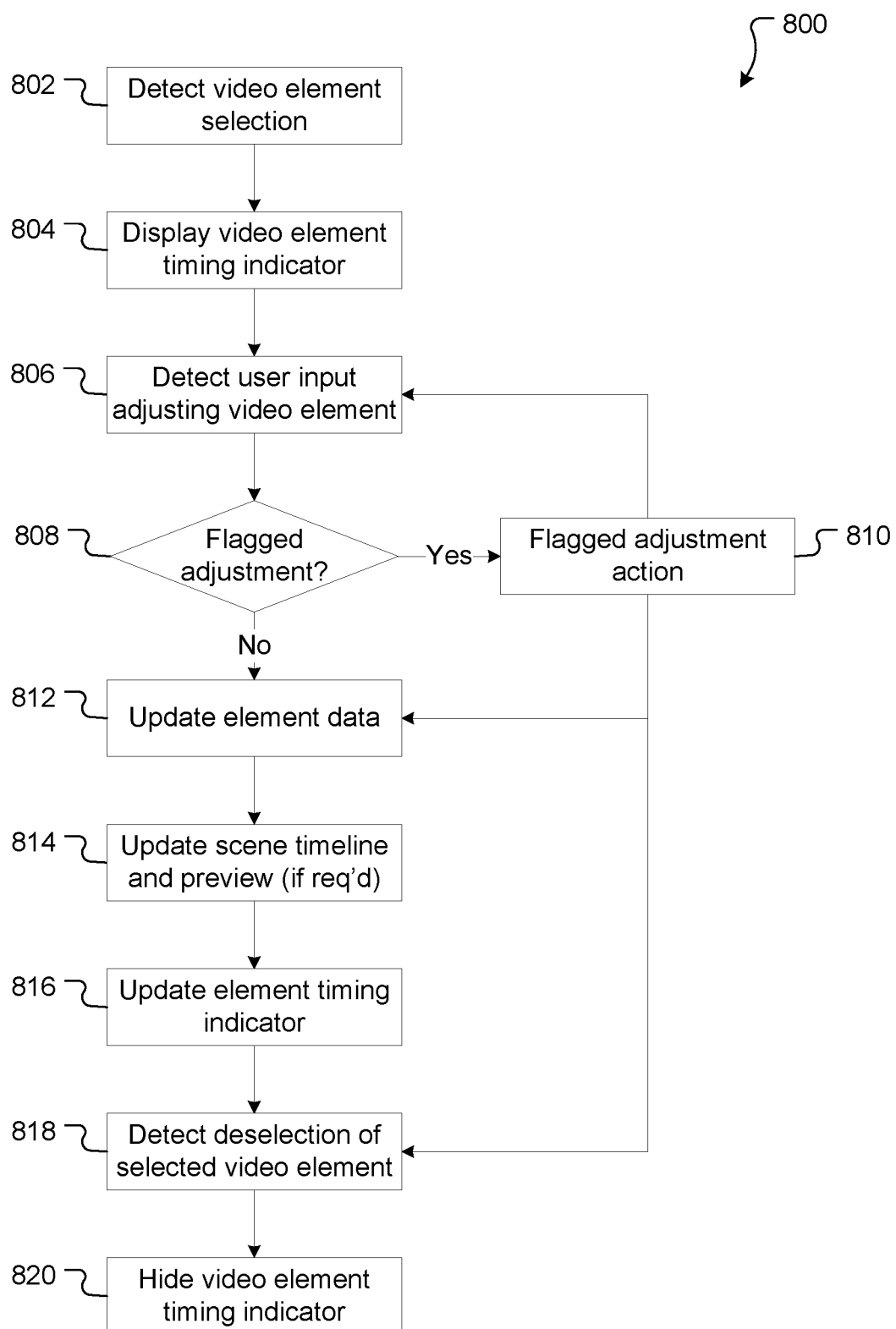
FIG. 8 is a flowchart depicting operations involved in adjusting the timing of a video element.

Turning to FIG. 8, a video element timing adjustment process 800 will be described. The process is also described with reference to FIG. 9 which depicts a partial version 900 of UI 400 of FIG. 4 (with only the design region 402 and timeline region 440 depicted).

At 802, the VEM 214 detects selection of a specific video element (which will be associated with a specific scene).

In some instances, selection of a specific video element initially involves the VEM 214 initially detecting user input selecting a particular scene preview 446 from the scene timeline 448. This causes the VEM 214 to display the state of the production at the start of the corresponding scene to be displayed on the canvas 404 (the state of the production being the particular visual elements 406 that are playing at that time). Once the canvas 404 (and visual elements thereon) is displayed, selection of a specific video element may, for example, be user input selecting a video element which is displayed thereon.

Alternatively, selection of a specific video element may be by adding a new video element to the canvas 404 (which in some implementations causes the newly added element to be selected by default), and/or by other means.

Figure 9:
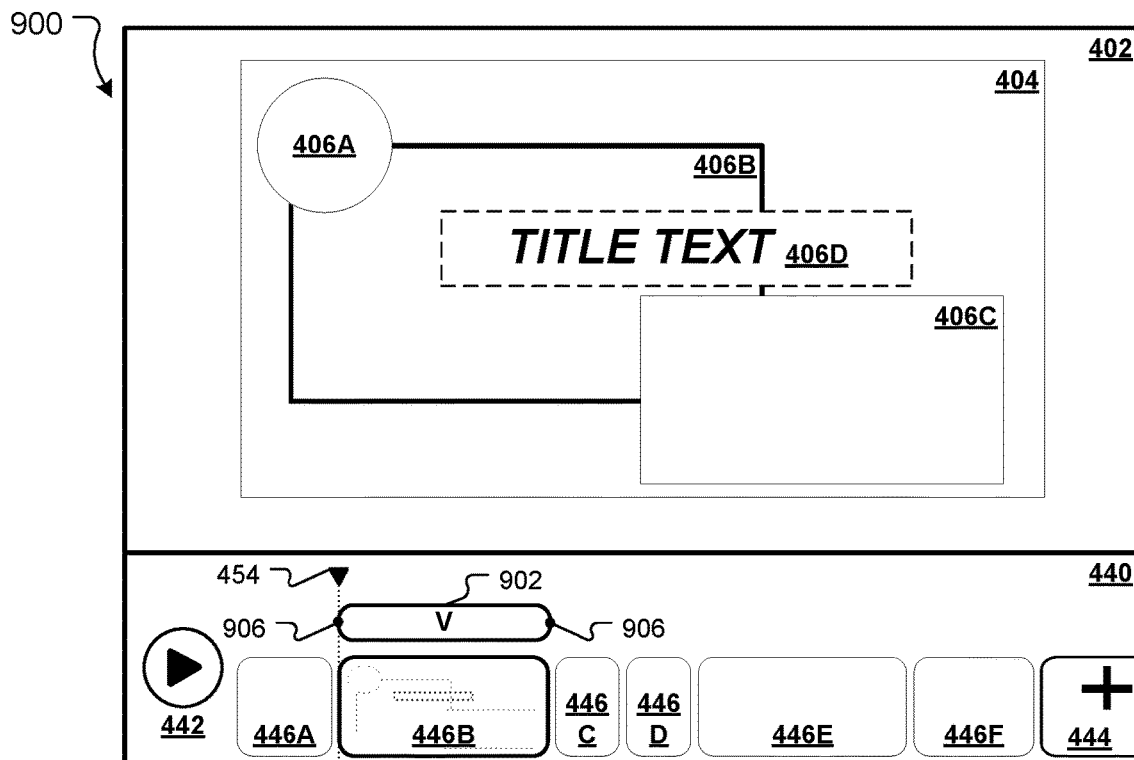
FIG. 9 depicts an example digital video production user interface.

On element selection, the VEM 214 may visually distinguish selected video element from any other non-selected elements. In the example of FIG. 9, the VEM 214 visually distinguishes the selected element 406B by displaying it with a heavier weight bounding box (though alternative mechanisms may be used).

At 804, the VEM 214 displays a visual element timing indicator corresponding to the selected video element.

In certain embodiments, when displaying a visual element timing indicator the VEM 214 displays the scene previews 446 of the scene timeline 448 at a reduced size (when compared to their display size when the visual element timing indicator is not displayed). This provides additional display space within the timeline region 440 for the visual element timing indicator. In this example the VEM 214 reduces the size of the scene previews 446 in one dimension (in this case the height) only so that the dimension indicating the duration of the scene (in this case the width) does not change.

FIG. 9 provides one example of a visual element timing indicator 902. Video visual element timing indicator 902 is a bar-shaped indicator that is aligned with the scene timeline 448 based on the element's start time and end time (or duration). This provides a visual indication of the play time of the video element in the production (and in the scene itself). In the present example, where the scene time line is a horizontal sequence of scene previews 446, the visual element timing indicator 902 is vertically aligned (e.g. above or below) with the scene timeline 448, its horizontal position along the scene timeline 448 indicating its play time within the production and the scene it appears in.

In FIG. 9 the visual element timing indicator 902 includes start and end edges 904 and 906 which are aligned (vertically in this example) with the scene preview 446 to indicate the start and end times of the selected element 406B in the scene. The start and end edges 904 and 906 of indicator 902 align with the start and end edges of scene preview 446B, indicating that the selected video element 406B plays for the duration of the scene.

In this example, the visual element timing indicator 902 includes a visual indication of the type of element it represents. In FIG. 9, the visual indicator is a letter 'V'. This visually distinguishes indicator 902 from a visual element timing indicator associated with another type of element—for example, a text type element (which may have a 'T'), an image type element (which may have an 'I'), and other types of elements. Once again, alternative means for visually distinguishing element timing indicators associated with different types of elements are possible—for example using a first colour for video elements, a second (different) colour for text elements, a third (different) colour for image elements and so on.

In FIG. 9 the height of the scene previews 446 has been reduced (when compared, for example, to the height of the scene previews 446 in FIG. 5) to accommodate the timing indicator 902.

At 806, the VEM 214 detects user input adjusting (or attempting to adjust) the timing of the selected video element.

User input adjusting the timing of the selected video element may be user input adjusting the start time of the video element. This may, for example, be user input dragging a start control associated with the visual element timing indicator 902 displayed for the selected element. In the example of FIG. 9, the start control is the start edge 904 of the visual element timing indicator (though alternative start controls are possible, for example a separate handle or other UI element displayed on or near the start edge). The user input adjusting the start time may, for example, be user input dragging the start control to an earlier start time (e.g. to the left) or a later start time (e.g. to the right).

User input adjusting the timing of the selected video element may be user input adjusting the end time of the video element. This may, for example, be user input dragging an end control associated with the visual element timing indicator 902 displayed for the selected element. In the example of FIG. 9, the end control is the end edge 906 of the visual element timing indicator (though alternative end controls are possible, for example a separate handle or other UI element displayed on or near the end edge). The user input adjusting the end time may, for example, be user input dragging the end control to an earlier end time (e.g. to the left) or a later end time (e.g. to the right).

User input adjusting the timing of the selected video element may be user input adjusting the start and end time of the video element (but not, in this case, the duration of the selected video element). This may, for example, be user input to slide or drag the entire visual element timing indicator 902 to the left (in this case earlier start and end times) or right (in this case later start and end times).

From the user input the VEM 214 calculates an adjustment time. For example, and where 24 pixels is equal to one second and the adjustment is by dragging the visual element timing indicator's start or end control, the adjustment time (in seconds) can be calculated as the horizontal drag distance divided by 24 (and assigning a negative sign if the adjustment is to an earlier time—e.g. a leftward drag).

At 808, the VEM 214 determines if the adjustment is a flagged video element timing adjustment. Generally speaking, a flagged video element timing adjustment is an adjustment that satisfies certain adjustment criteria and requires the VEM 214 to take additional action.

If the adjustment is not a flagged video element timing adjustment, processing proceeds to 812. Otherwise, processing proceeds to 810 where the additional action is performed. The additional action will depend on the reason the adjustment has been flagged. As discussed below, this may involve, for example, displaying an alert, requesting user input (e.g. by displaying an appropriate UI element), and/or preventing the adjustment from being made. As also discussed below, following the action at 810, processing may continue to 812 (to make the adjustment), return to 806 (to detect an alternative adjustment input), or proceed to 820 (where the selected element is deselected).

The following provides examples of flagged video element timing adjustments (detected at 808) and consequent actions (performed at 810). Additional and/or alternative flagged adjustments are possible.

In certain embodiments, the VEM 214 is configured to detect if the adjustment would result in a video element start time for which no video data exists. For example, a video element may have a start trim value of 10 seconds. In this case, the start time for the video element can be adjusted to 10 seconds earlier but not beyond. In this case the VEM 214 may (at 810) prevent a user from dragging the start control of the visual element timing indicator beyond the start of the video element.

In certain embodiments, the VEM 214 is also (or alternatively) configured to detect if the adjustment would result in an end time which would require the video element to loop. For example, a video element may have an end trim value of 20 seconds. In this case, the end time for the video element can be adjusted to 20 seconds later without looping, but any adjustment of greater than 20 seconds would require the video to loop. In this case, and unless the video element had already been set to loop, the VEM 214 may allow the adjustment, may allow the adjustment but display (at 810) an alert indicating that the video element has now been set to loop, or display (at 810) a prompt asking for input as to whether the video should be set to loop or the adjustment should be abandoned.

In certain embodiments, the VEM 214 is also (or alternatively) configured to detect if the adjustment would result in the video element ending after the scene it has been added to ends. In the present example, the VEM 214 will permit such an adjustment and cause the scene duration to be extended to accommodate the adjusted video element's end time. This may be done automatically at 810 (with or without displaying an alert) or only after displaying a prompt and receiving user input that the scene should be lengthened. If the scene's duration needs to be lengthened, VEM 214 does so by updating the duration in the scene record for the scene. If the scene's duration is lengthened, further adjustments to audio elements, graphic elements, and/or subsequent scenes in the production may be required (as described above with reference to scene duration adjustments).

Alternatively, the VEM 214 may prevent (at 810) an adjustment that would result in a video element ending outside of the scene it has been added to.

In certain embodiments, the VEM 214 is also (or alternatively) configured to detect if an end time adjustment indicates that the scene duration may need to be shortened. The VEM 214 determines this if, prior to the adjustment, the video element being adjusted ends at the end of the scene and is the only video element to do so. In this case the VEM 214 may automatically shorten the scene's duration (at 810) or display (at 810) a prompt asking if the duration of the scene should be shortened to match the duration of the longest video element in the scene (which may be the selected video element following its adjustment or an alternative video element). If the scene is to be shortened, the VEM 214 may calculate the new (shortened) scene duration based on the latest end play time of any video element in the scene. If the scene's duration is shortened, further adjustments to audio elements, graphic elements, and/or subsequent scenes in the production may be required (as described above with reference to scene duration adjustments).

At 812, the VEM 214 updates the element record for the adjusted video element. In the context of the production data described above, this involves the following adjustments, which are described with reference to an adjustment time of x seconds (as calculated above).

For a start time adjustment, the VEM 214 adjusts the start trim point (existing trim point plus the adjustment value), the start offset (existing start offset plus the adjustment value), and (if stored) the duration (existing duration minus the adjustment value) of the video element's element record.

For an end time adjustment, the VEM 214 adjusts the end trim point (existing trim point plus the adjustment value) and (if stored) the duration (existing duration plus the adjustment value) of the video element's element record.

For an adjustment to both start and end time (e.g. dragging or sliding the entire timing indicator 902), the VEM 214 adjusts the start offset of the video element only. In this case the trim point data remains the same as does the duration (if stored).

At 814, the VEM 214 updates the scene timeline 448 (if required). This will be required if the scene's duration has changed, in which case the display length of the scene preview 446 corresponding to the scene that has been adjusted may need to be changed to reflect the new duration. This, in turn, may cause downstream scene previews 446 in the scene timeline 448 to be shifted (in this example to the left if the given scene's duration has been shortened or to the right if the given scene's duration has been lengthened).

At 816, the VEM 214 updates the visual element timing indicator 902 in accordance with the adjusted timing of the video element. If the start time of the element has been adjusted, the VEM 214 displays the start edge 904 in a new position corresponding to the new start time (e.g. a leftward position if an earlier start time or a rightward position if a later start time). Similarly, if the end time of the element has been adjusted, the VEM 214 displays the end edge 906 in a new position corresponding to the new end time (e.g. a leftward position if an earlier end time or a rightward position if a later end time).

At 818, the VEM 214 determines that the selected element has been deselected. This may, for example, be by detection of user input selecting another element on the canvas 404, detection of user input selecting a different scene of the production, detection of user input selecting an alternative control provided by the UI, a timeout, or detection of an alternative event.

At 820, in response to determining deselection of the selected element, the VEM 214 hides the visual element timing indicator 902. If a new element has been selected a new visual element timing indicator in respect of the newly selected element may be displayed.

As noted above, in certain embodiments the VEM 214 causes the scene previews 446 to be displayed at a reduced size when an element timing indicator 902 is displayed. In this case, and if the element timing indicator 902 is hidden at 820, the VEM 214 displays the scene previews 446 at their normal size.

Figure 10:
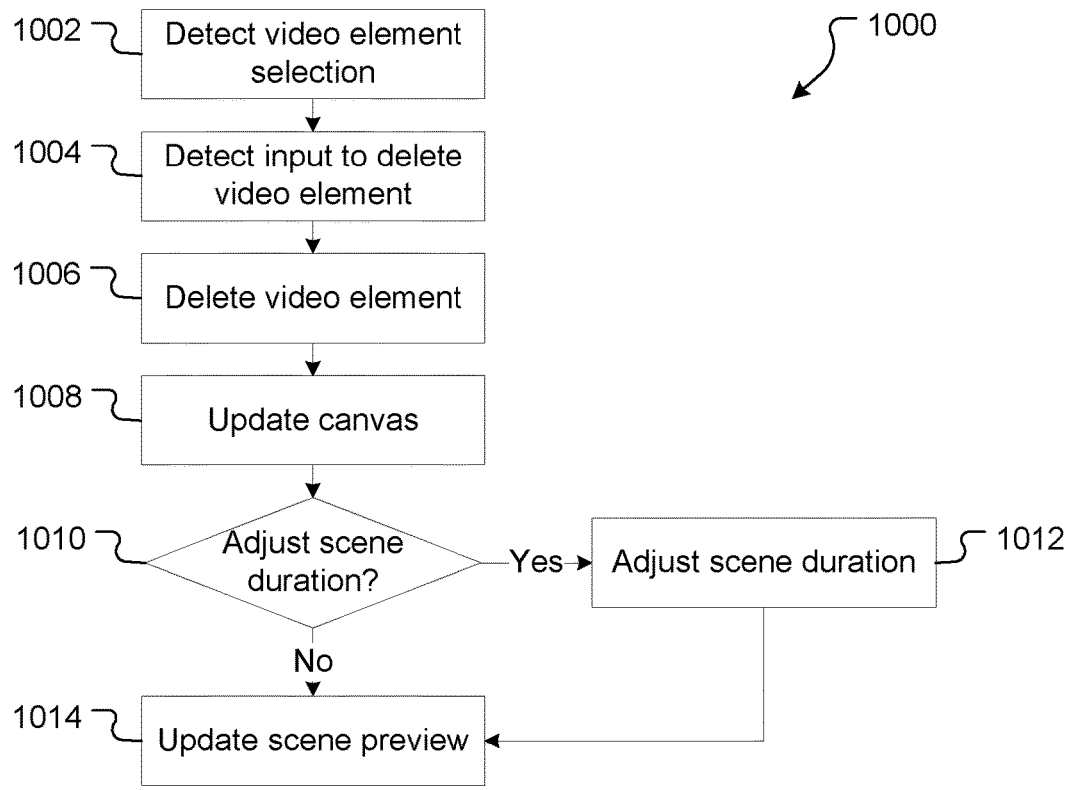
FIG. 10 is a flowchart depicting operations involved in deleting a video element from a digital video production.

Turning to FIG. 10, a video element deletion process 1000 will be described.

At 1002, the VEM 214 detects selection of a specific video element of a specific scene. This may, for example, be as per 802 of FIG. 8. Selection of the video element causes the VEM 214 to display an element timing indicator as described at 804 above.

At 1004, the VEM 214 detects input to delete the selected video element. Such input may be via activation of a delete control 432 which is displayed on selection of the element, user input navigating a menu structure and selecting a delete control, a keyboard shortcut, or an alternative input.

At 1006, the VEM 214 deletes the selected video element. In the present example this involves deleting the element record from the scene's element array.

At 1008, the VEM 214 updates the canvas 404 to delete the representation of the deleted video element.

At 1010, the VEM 214 determines if the duration of the scene the video element has been deleted from is to be adjusted. If so, processing proceeds to 1012, if not to 1014. In the present embodiment the scene duration will need to be adjusted if, following deletion of the video element in question, there is no non-looping video element that plays to the end of the scene.

In the present embodiment, at 1012 the VEM 214 adjusts the scene duration. In the present example, and unless doing so results in a visual element being deleted, this involves shortening the scene's duration so it ends at the latest end of any video element in the scene. Adjusting the scene's duration may result in adjustments to audio elements, graphic elements, and/or subsequent scenes in the production (as described above with reference to scene duration adjustments).

In alternative embodiments, the VEM 214 may not perform the processing at 1010 and 1012 (i.e. not consider adjustment of the scene duration), or may alert a user at 1012 that the scene duration could potentially be shortened (and shorten only if confirmation input is received).

At 1014, the VEM 214 updates the scene preview 446 to remove the preview of the now-deleted video element. If the scene duration is shortened at 1014, the VEM 214 also updates the display length of the scene preview 446 (and the positions of downstream scene previews 446 in the scene timeline 448). Furthermore, the visual element timing indicator (e.g. 902) displayed in response to selection of the video element at 1002 is hidden.

Figure 11:
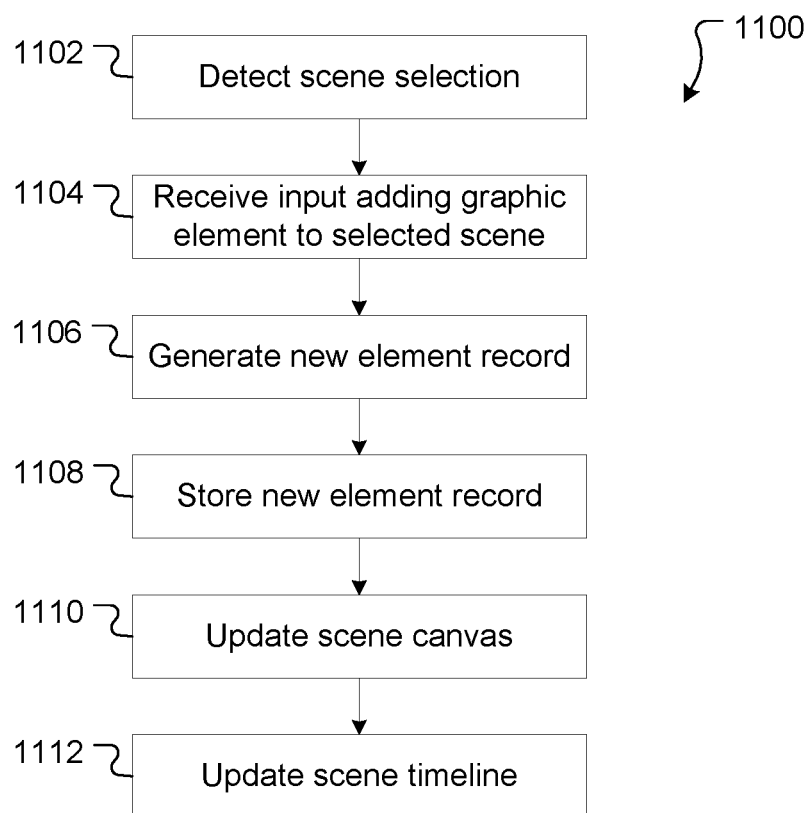
FIG. 11 is a flowchart depicting operations involved in adding a graphic element to a digital video production.

Turning to FIG. 11, a graphic element addition process 1100 will be described.

At 1102, the VEM 214 detects that a particular scene of the production has been selected. This may, for example, be the same as or similar to 702 described above.

At 1104, the VEM 214 receives user input to add a graphic element to the selected scene. This may, for example, be the same as or similar to 704 described above (excepting in relation to a graphic element rather than a video element).

At 1106, the VEM 214 generates element data in respect of the new graphic element being added to the scene. In the present example this involves generating a new visual element record.

The type for the element record takes a value corresponding to a type of the new graphic element (e.g. image, text, chart/graph, or other graphic element type).

The position for the element record may take a default position (e.g. centered on the canvas 404) or a position based on the user input adding the element (e.g. centered on a position at which the user dropped the element, or the position closest thereto if that position would leave the element partially off-canvas). This can be adjusted by the user at a later time, e.g. by entry of origin coordinates and/or dragging the element to a new position on the canvas 404.

The size of the element will be the native size of the graphic element. This can be adjusted by the user at a later time, e.g. by entry of a size/scaling factor and/or interaction with the UI to manipulate a bounding box of the element.

The element source will provide a reference to the content of the graphic element.

The animation style is initially set to null (or a default value). This can be adjusted by a user at a later time (e.g. by selecting the element and using controls such as 432 or other controls to do so).

In the present embodiment, when a new graphic element is added to a scene the VEM 214 is configured to cause the element to display for the length of the scene: i.e. to start playing at the start of the scene and end playing at the end of the scene. To achieve this, the VEM 214 may, for example, set the scene start offset to 0 and the play duration to equal the duration of the scene. The new element's timing (e.g. start offset, play duration, and/or scene anchor values) may be adjusted by a user at a later time.

At 1108, the VEM 214 causes the element data generated at 1106 to be stored (e.g. at server system 202 and/or locally as described above).

At 1110, the VEM 214 updates the canvas 404. In the present embodiment this involves displaying the new graphic element (or a representation thereof) on the canvas 404. The VEM 214 displays the element according to the data (e.g. position and size) determined at 1106.

At 1112, the VEM 214 updates the scene timeline 448. In the present embodiment this involves updating the preview 446 of the selected scene to include a representation of the newly added graphic element (for example as depicted in scene preview 446B of FIG. 5). The preview of the newly added video element may be a smaller (and lower resolution) version of the graphic element added to the canvas at 1110, an outline of the element, or an alternative preview of the element.

Figure 12:
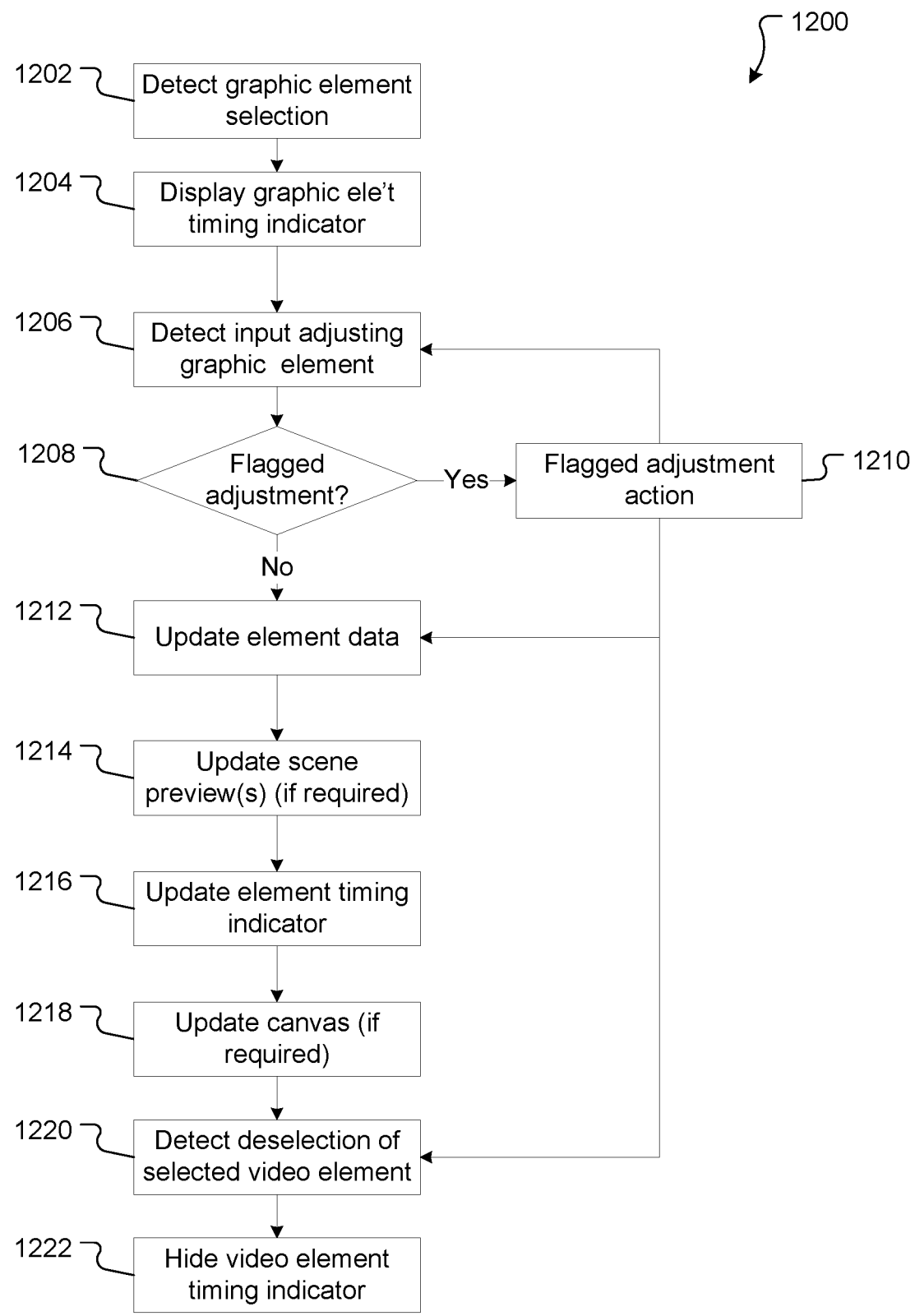
FIG. 12 is a flowchart depicting operations involved in adjusting the timing of a graphic element.

Turning to FIG. 12, a graphic element timing adjustment process 1200 will be described. The process is also described with reference to FIG. 13, which depicts partial versions 1300, 1310, 1320, and 1330 of UI 400 of FIG. 4.

At 1202, the VEM 214 detects selection of a specific graphic element of a specific scene. This (and visually distinguishing the selected graphic element) may, for example, be the same as or similar to 802 describe above. In the example UIs depicted in FIG. 13, the text graphic element 406D in the scene corresponding to scene preview 446B is selected.

At 1204, the VEM 214 displays a visual element timing indicator corresponding to the selected graphic element. The visual element timing indicator is, in this instance, similar to that described with reference to 804 described above. In this case, visual element timing indicator 1302 includes a visual indication indicates that it is a text type graphic element (in this case indicated by the letter 'T').

As with 804 described above, when displaying the visual element timing indicator the VEM 214 may also display the scene previews 446 of the scene timeline 448 at a reduced size At 1206, the VEM 214 detects user input adjusting the timing of the selected graphic element. This input (and the adjustment time value calculated) may be similar to, or the same as user input adjusting the timing of a video element as described at 806 above. The user input may be adjust the start of the selected graphic element (e.g. input dragging the start edge 1304 to an earlier or later time), the end of the graphic element (e.g. input dragging the end edge 1304 to an earlier or later time), or the start and end of the graphic element (e.g. input dragging the entire visual element timing indicator 1302 to an earlier or later time slot).

At 1208, the VEM 214 determines if the adjustment is a flagged graphic element timing adjustment. Generally speaking, a flagged graphic element timing adjustment is an adjustment that satisfies certain adjustment criteria and requires the VEM 214 to take additional action.

In the present embodiment, the only flagged graphic element timing adjustments are adjustments attempting to cause the selected graphic element to start before the start of the production or end after the end of the production. In either of these cases, processing proceeds to 1210 where the VEM 214 prevents the start edge 1304 being dragged leftward beyond the start edge of the first scene preview 446A or the end edge 1306 being dragged rightward beyond the end edge of the last scene preview 446F. In response the user may leave the start/end of the graphic element at the start/end of the production (in which case processing proceeds to 1212), or abandon the adjustment (in which case processing proceeds to either 1206 or 1220).

In other embodiments, the VEM 214 may be configured to prevent any adjustment that would take the graphic element outside of the scene it is currently in.

At 1212, the VEM 214 updates element data based on the adjustment. In the context of the production data described above, and where an element may be adjusted to span multiple scenes, this involves updating one or more element records which can be done in various ways.

In the present embodiment, to update element data the VEM 214 calculates an overall production start time and overall production end time for the graphic element. The overall production start time is calculated as an offset from the production start and is the scene start offset of the element in the earliest scene the element appears in plus the durations of any scenes preceding the scene the element first appears in.

Similarly, the overall production end time may be calculated based on the duration of the graphic element in the last scene the element appears in (added to the scene durations of all preceding scenes).

Consider, for example, a production with four scenes having scene durations of 60 seconds, 30 seconds, 30 seconds, and 120 seconds respectively. The production has a graphic element whose timing is adjusted to play from 5 seconds into the second scene of the production to 30 seconds into the fourth scene of the production. In this case the overall production start time for the element would be 65 seconds (i.e. 5 seconds into the second scene) and overall production end time for the element would be 150 seconds (i.e. 30 seconds into the $4^{th}$ scene).

Using the overall production start and end times, the VEM 214 determines which scene or scenes of the production the graphic element now appears in and the relevant timing data for the element within that/those scene(s).

If, following the adjustment, the graphic element appears in a single scene, the VEM 214 determines the start offset (in that scene) and duration for the graphic element. If the element previously appeared in the single scene the VEM 214 updates the element's existing record in that scene's element array. If the element previously appeared in multiple scenes the VEM 214 also updates the element record to remove the multi-scene identifier (and deletes element records with that multi-scene element identifier from the other scene element arrays).

If the graphic element appears in more than one scene, the VEM 214 determines the start offset and duration for the graphic element in each scene. If a graphic element is played for the entirety of a scene, the start offset is 0 and duration is the duration of the scene. Otherwise, the start offset and duration are set according to when the element starts and stops being played in the scene. In addition, if the element was not previously a multi-scene element, the VEM 214 generates a new multi-scene element identifier for the element records that are generated (and includes that identifier in those element records). If the element was already a multi-scene element a multi-scene element identifier will already exist for the element. For any scene the element previously appeared in the VEM 214 updates the element's record in that scene's element array to record any changes to the start offset or duration (and records the new multi-scene element identifier if the element was not previously a multi-scene element). For any scene the element did not previously appear in, a new element record is created and added to that scene's element array. The new element record includes the start offset and duration, other element data (e.g. size, position, etc., as taken from an existing element record describing the graphic element), and the multi-scene element identifier.

For example, for the hypothetical element above which is adjusted to play from 5 seconds into the $2^{nd}$ scene to 30 seconds into the $4^{th}$ scene, the VEM 214 would create/update visual element records as follows: an element record in the $2^{nd}$ scene's element array (with scene start offset 5, duration 25, multi-scene element identifier 0001); an element record in the $3^{rd}$ scene's element array (with scene start offset of 0, duration 30, multi-scene element identifier 0001); and an element record in the 4th scene's element array (with start offset 0, duration 30, multi-scene element identifier 0001).

At 1214, the VEM 214 updates one or more scene previews 446 in the scene timeline 448 (if required). In the present embodiments this will be required if the graphic element either appears in one or more scenes it did not previously appear in (in which case the scene preview(s) 446 of those scene(s) are updated to display a preview of the graphic element) or no longer appears on one or more scenes it previously appeared in (in which case the scene preview(s) 446 of those scene(s) are updated to remove the preview of the graphic element).

In some implementations, if the element adjustment causes the selected element to only display for part of a given scene the VEM 214 displays a partial-scene element indicator (e.g. an icon, badge, text, or other indicator) on (or proximate) the element representation in the scene's preview 446. An example partial-scene indicator 1312 is shown in partial UI 1310 of FIG. 13. The VEM 214 may be configured to display the partial-scene indicator 1312 permanently or only at certain times (e.g. on user interaction with the scene's preview such as a hover or other interaction).

At 1216, the VEM 214 updates the visual element timing indicator 1302 in accordance with the adjusted timing of the graphic element. If the start time of the element has been adjusted, the VEM 214 displays the start edge 1304 in a new position corresponding to the new start time. Similarly, if the end time of the element has been adjusted, the VEM 214 displays the end edge 1306 in a new position corresponding to the new end time.

At 1218, the VEM 214 updates the displayed canvas 404 (if required). This will be required if the selected element has been moved so that it is no longer displayed at the playback position currently reflected in the canvas 404 (e.g. as indicated by the playhead 454). In this case the element representation is removed from the canvas 404.

Figure 13:
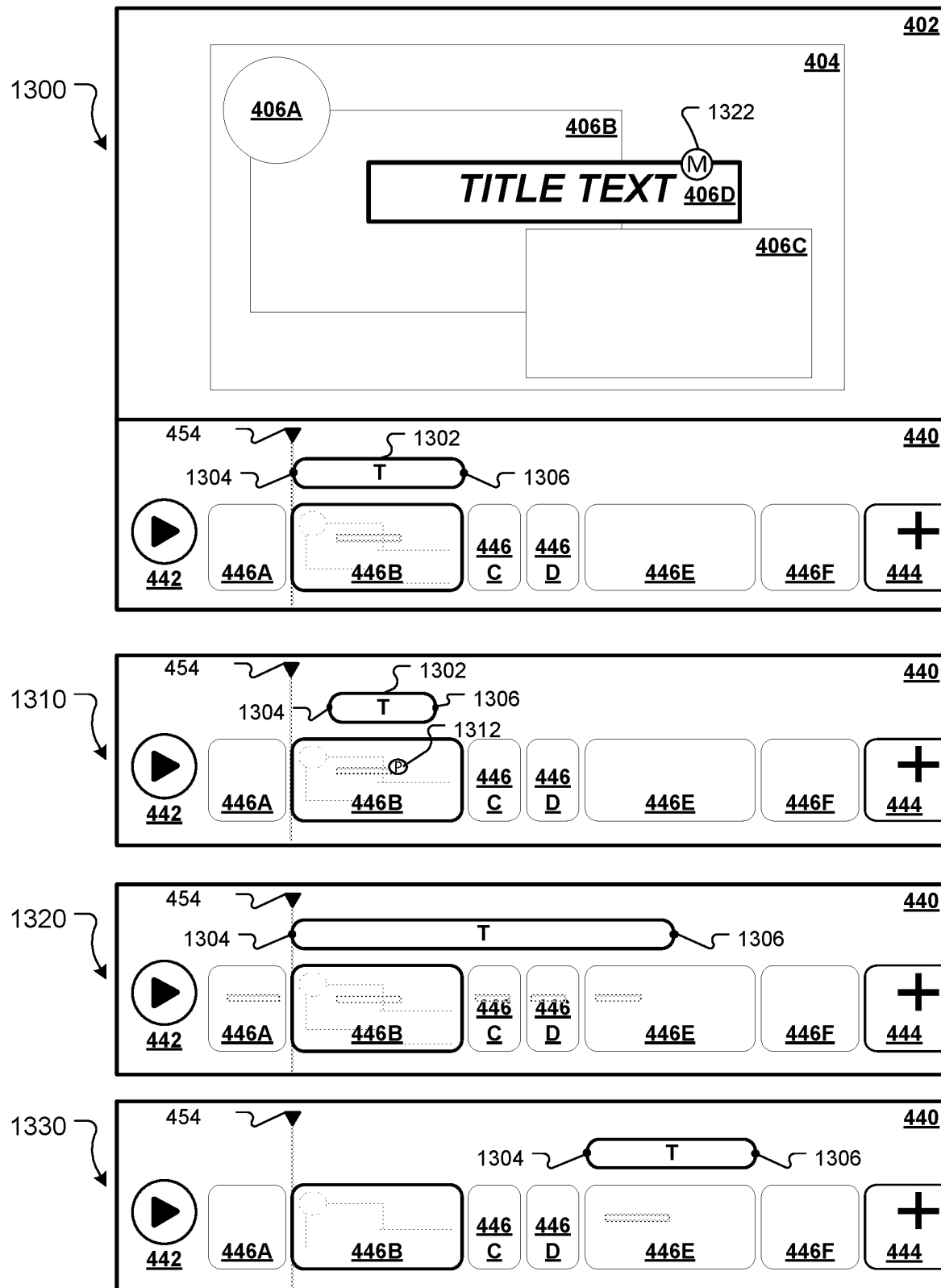
FIG. 13 depicts example digital video production user interfaces.

In some implementations, if the element adjustment causes the selected element to become a multi-scene element, the VEM 214 displays a multi-scene element indicator (e.g. an icon, badge, text, or other indicator). An example multi-scene element indicator 1322 is shown in FIG. 13. In this example the multi-scene element indicator 1322 is displayed on the canvas 404. The indicator could (alternatively or additionally) be displayed in the scene previews 446 of the scenes the multi-scene element appears in.

At 1220, the VEM 214 determines that the selected graphic element has been deselected. This may, for example, be the same as or similar to 818 described above.

At 1222, in response to determining deselection of the selected element, the VEM 214 hides the visual element timing indicator 1302. If applicable, when hiding the timing indicator 1302 the VEM 214 also displays the scene previews 446 of the scene timeline 448 at their normal size.

FIG. 13 depicts example adjustments to a graphic element's display timing.

Partial UI 1300 is partial version of UI 400 of FIG. 4 (with only the design region 402 and timeline region 440 depicted). This shows selection of graphic element 406D and the consequent display of visual element timing indicator 1302. Element timing indicator 1302 shows that element 406D is a text element (indicated by the 'T') and plays for the duration of the scene corresponding to scene preview 446B.

Design region 402 in partial UI 1300 includes examples of a multi-scene element indicator 1322. It is noted, however, that this would not actually be displayed in partial UI 1300 (as in this particular example graphic element 406D is not a multi-scene element). Multi-scene indicator would be displayed in the design region 402 accompanying partial UI 1320.

Partial UI 1310 shows the timeline region 440 of UI 1300 after two timing adjustments have been made. In one adjustment the start edge 1304 of the visual element timing indicator has been dragged to a later time within scene 446B (to the right). In the other adjustment the end edge 1304 of the visual element timing indicator has been dragged to an earlier time within scene 446B (to the right).

For both of these adjustments the graphic element 406D does not change scenes or become a multi-scene element. Accordingly, and assuming the adjustment to the start of the element occurred first, for the adjustment to the start time the VEM 214 would update the existing element record with the new start offset and duration (at 1212) and update the visual element timing indicator (at 1216). For the second adjustment to the end time the VEM 214 would update the existing element record with the new duration (at 1212) and update the visual element timing indicator (at 1216). Both adjustments result in the selected element being played over only part of the scene, and as such VEM 214 causes a partial-scene element indicator such as 1312 to be displayed at 1214 with the element's representation in the scene preview 446B. At 1220, the VEM updates the canvas 404 of the selected scene (446B) to remove the element representation 406D (as the element no longer appears at the time represented by the playhead 454).

Partial UI 1320 shows the timeline region 440 of UI 1300 after a timing adjustment in which the end edge 1306 of the visual element timing indicator has been dragged to a later time within scene 446E.

In this case the element now spans multiple scenes. Accordingly, at 1214 the VEM 214: determines that the element spans scenes 446B, 446C, 446D, and 446E; updates the element's element record in scene 446B's scene array (by recording a newly created multi-scene element identifier for the element); generates a new element record (based on the element record of 446B) and adds this to the element array of scene 446C (the element timing data set to cause the element to display for the entirety of scene 4460); generates a new element record (based on the element record of 446B) and adds this to the element array of scene 446D (the element timing data set to cause the element to display for the entirety of scene 446D); and generates a new element record (based on the element record of 446B) and adds this to the element array of scene 446E (the element timing data set to cause the element to display from the start of scene 446E until a point mid-way through the scene). At 1216, the VEM 214 updates the scene previews of the new scenes the element now appears in. This involves adding a preview of element 406D to scene previews 446C, 446D and 446E. At 1218, the VEM 214 updates the visual element timing indicator to reflect the adjusted end time (as shown in partial UI 1320). The adjustment results in the selected element becoming a multi-scene element, and as such the VEM 214 would (in the present embodiment) cause a multi-scene element indicator such as 1322 to be displayed.

Partial UI 1330 shows the timeline region 440 of UI 1300 after a timing adjustment in which the visual element timing indicator 1302 of the selected graphic element has been dragged (as a whole) to a new scene (scene 446E).

In this case the element is no longer displayed in the original scene 446B (and is now displayed in a new scene 446E). Accordingly, at 1214 the VEM 214 determines that the element is newly displayed in scene 446E so generates a new element record (based on the original record) and saves this in the element array of scene 446E. In this particular example the element duration has not changed. In addition, the VEM 214 determines that the element no longer appears in scene 446B, so deletes the element's record from that scene's element array. At 1216, the VEM 214 updates the scene preview 446B to remove the preview of the element 406D (which no longer appears in the scene), and updates the scene preview of scene 446E to display a preview of the element 406D (which newly appears in the scene). At 1218, the VEM 214 updates the visual element timing indicator to reflect the adjusted end time (as shown in partial UI 1330). At 1220, the VEM updates the canvas 404 to remove the element representation 406D (as the element no longer appears at the time represented by the playhead 454).

Figure 14:
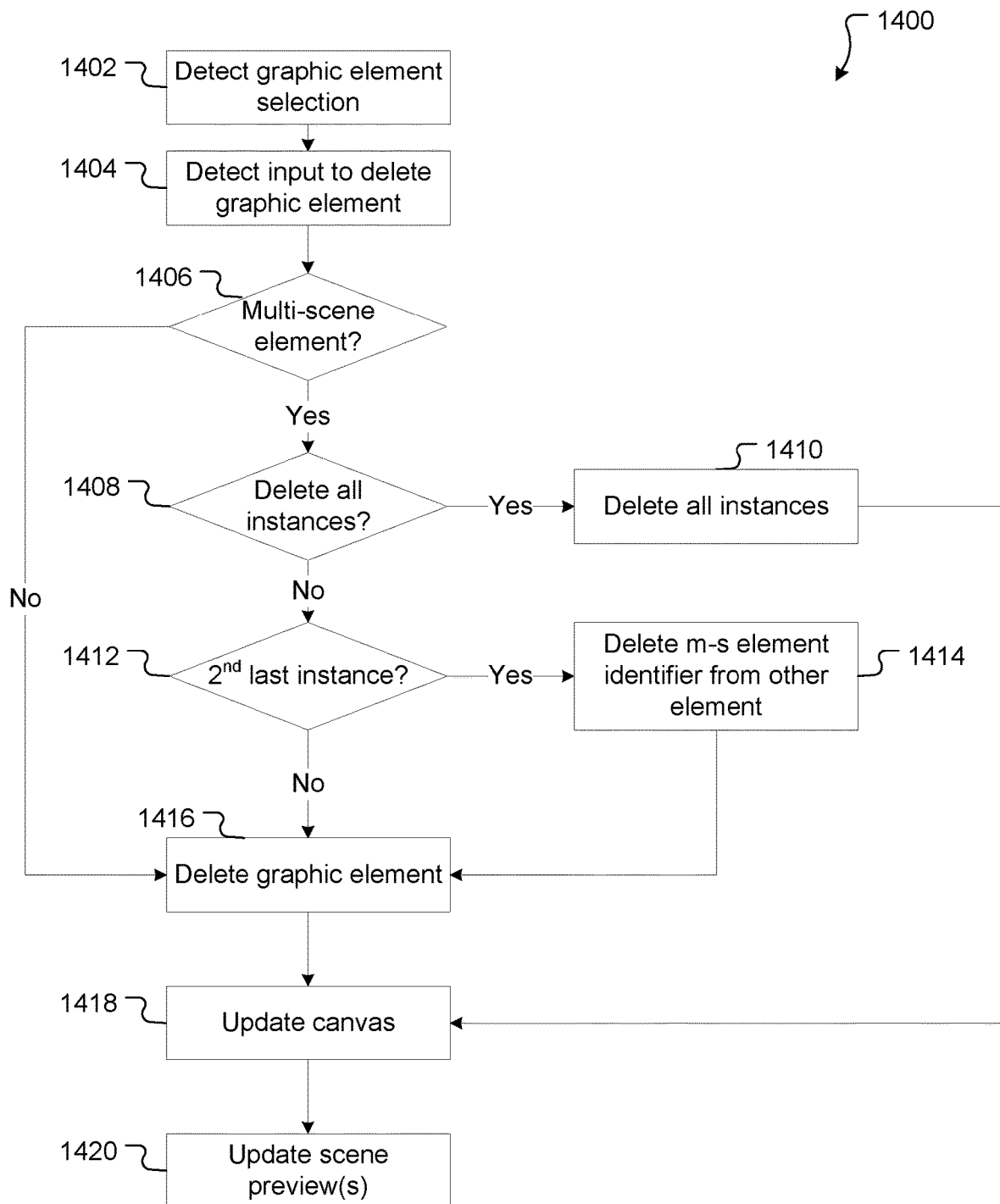
FIG. 14 is a flowchart depicting operations involved in deleting a graphic element from a digital video production.

Turning to FIG. 14, a graphic element deletion process 1400 will be described.

At 1402, the VEM 214 detects selection of a specific graphic element in a specific scene. This may, for example, be as per 802 of FIG. 8.

At 1404, the VEM 214 detects input to delete the selected graphic element. Such input may be via activation of a delete control 432 which is displayed on selection of the element, user input navigating a menu structure and selecting a delete control, a keyboard shortcut, or an alternative input.

At 1406, the VEM 214 determines if the selected element is a multi-scene element. In the present example this will be the case if the element record includes a multi-scene element identifier. If the element is a multi-scene element, processing proceeds to 1408. If not processing proceeds to 1416.

At 1408, the VEM 214 displays an alert indicating that the element is an instance of a multi-scene element and requests input from the user asking whether all instances of the element should be deleted or only the currently selected instance. In alternative embodiments, if the selected element is an instance of a multi-scene element the VEM 214 may automatically delete all instances of the multi-scene element from the production without requesting user confirmation.

If the user input indicates all instances are to be deleted processing proceeds to 1410. In this case, the VEM 214 deletes all instances of the multi-scene element (i.e. by removing all element records having the relevant multi-scene record identifier from all scene arrays). Processing then proceeds to 1418.

If the user input indicates that only the current instance is to be deleted processing proceeds to 1412. In this case, the VEM 214 determines if the selected element is the 2$^{nd}$ last instance of the particular multi-scene element. This will be the case if there is only one other graphic element that has the same multi-scene element identifier. If the selected element is the second last instance processing proceeds to 1414. If not processing proceeds to 1416.

At 1414, there is only one other element with the same multi-scene element identifier. In this case the VEM 214 deletes the multi-scene element identifier from the other graphic element that has the same multi-scene identifier (as, on deletion of the selected element, the other element will no longer be a multi-scene element). Processing the proceeds to 1416.

At 1416, the VEM 214 deletes the selected graphic element. In the present example this involves deleting the element record from the scene's element array.

At 1418, the VEM 214 updates the canvas 404 to delete the representation of the deleted graphic element.

At 1420, the VEM 214 updates the scene preview(s) 446 to remove the representation of the now-deleted graphic element. If the element was a multi-scene element and all instances of the element were deleted (at 1410) the now deleted multi-scene element's representation is deleted from all relevant scene previews 446.

Figure 15:
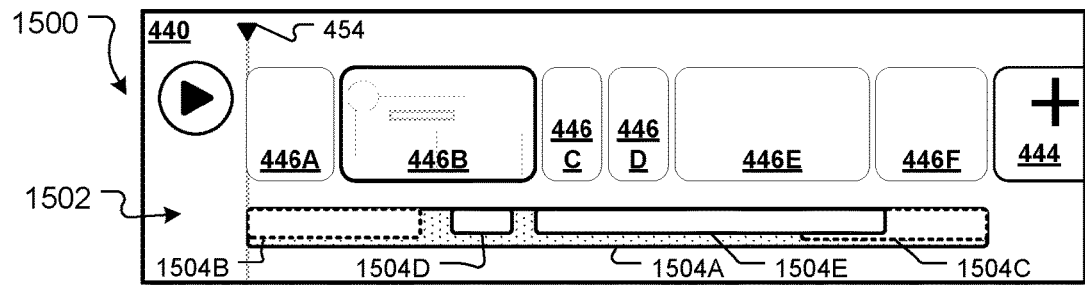
FIG. 15 depicts example digital video production user interfaces.
Figure 15:
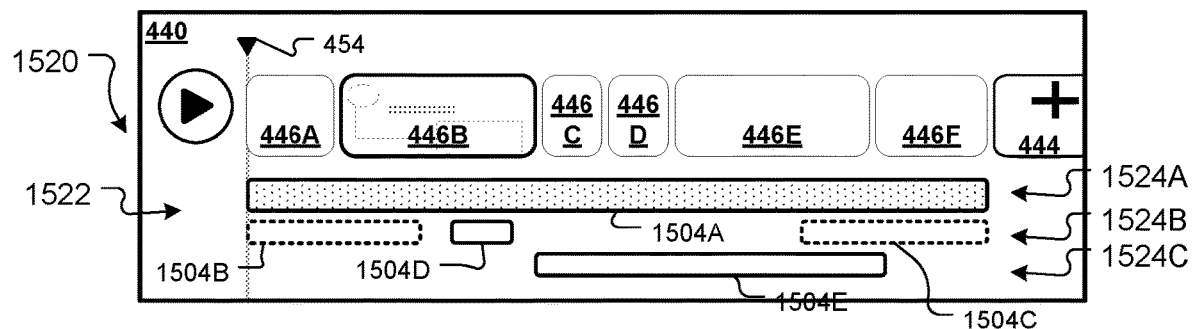
Figure 15:
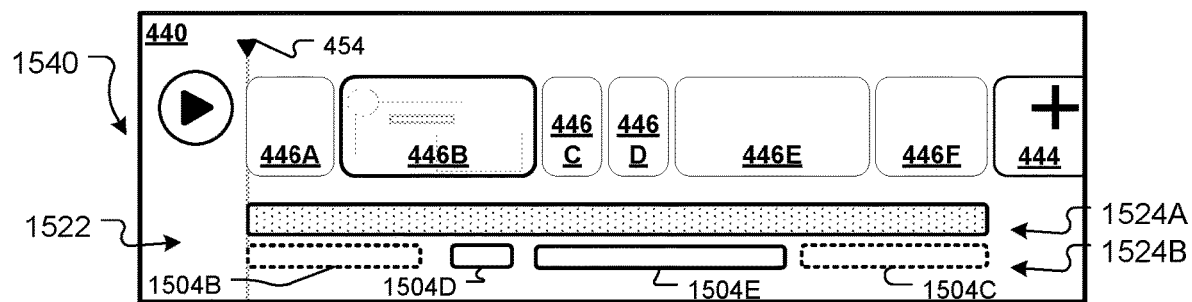
Figure 15:
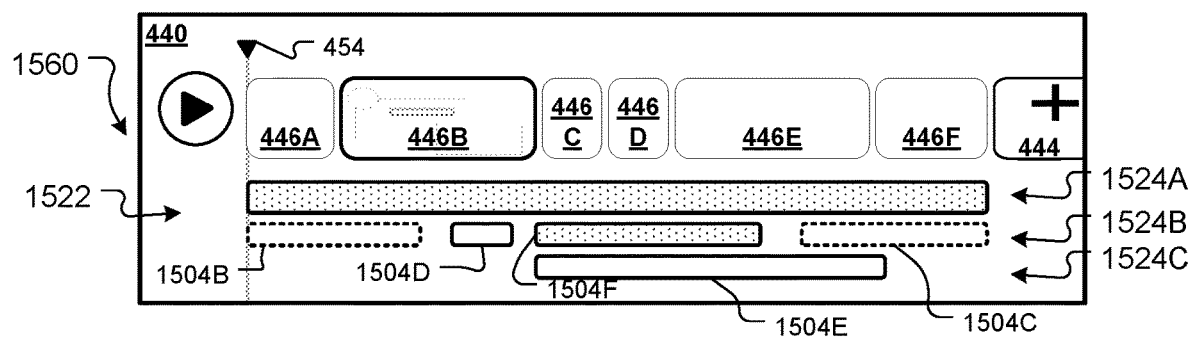

FIG. 15 depicts partial versions of UI 400 of FIG. 4 (with only the timeline region 440 depicted).

Partial UI 1500 includes a collapsed audio timeline 1502 which is parallel to the scene timeline 448. The VEM 214 may be configured to display the collapsed audio timeline 1502 permanently/whenever the scene timeline 442 is displayed. Alternatively, display of the collapsed audio timeline 1502 may be displayed in response to the value of a user-set toggle (e.g. an audio timeline on/off control) or other event (for example a user selecting an audio element type control 410 and/or to search for audio elements in search region 420).

The collapsed audio timeline 1502 is made up of one or more audio timing indicators 1504. Each audio timing indicator 1504 is associated with an audio element that has been added to the production. In the present example, the audio timing indicators 1504 have visual appearances that indicate a type of the audio element that is indicated by the indicator 1504 (e.g. a sound effect, music tracks, spoken word tracks). For example, collapsed audio timeline 1502 includes audio timing indicator 1504A which is displayed in a first display format (indicated in this example with dot-shading), audio timing indicators 1504B and 1504C which are displayed in a second display format (indicated in this example with a broken-line outline), and collapsed timing indicators 1504D and 1504E which are displayed in a third display (in this example a solid border line format). In practice visual differentiation may be achieved in alternative ways, for example by use of different colours and/or annotations. In this example, the first display format may indicate a music track, the second display format may indicate a spoken word track, and the third display format may indicate sound effects.

In the present implementation, where audio elements play concurrently the VEM 214 displays their associated timing indicators 1504 with increasingly (from background to foreground) reduced heights so the audio tracks that are being concurrently played can be seen. In partial UI 1500, indicator 1504A indicates the longest playing audio element. Indicator 1504 is displayed as the rearmost indicator 1504 and has a first height. Indicator 1504C indicates an audio track which plays concurrently with the audio track indicated by indicator 1504A. Indicator 1504C is displayed with a second height (which is less than the first height of indicator 1504A) so indicator 1504A can be seen behind indicator 1504C. Indicator 1504E indicates an audio track which plays concurrently with the audio tracks indicated by indicators 1504A and 1504C. Indicator 1504E is displayed with a third height (which is less than the second height of indicator 1504C) so indicators 1504A and 1504C can be seen behind indicator 1504E.

In certain embodiments the VEM 214 is configured to display each audio indicator 1504 as (or with) a waveform that indicates (at least generally) peaks and troughs of the audio element that the indicator 1504 represents. These peaks and troughs can be used to align audio elements with visual elements of the production.

The audio timing indicators 1504 of the collapsed audio timeline 1502 are displayed to be aligned with the scene timeline 448 in a similar manner to the visual element timing indicators described above. In this example audio timing indicators 1504 are vertically aligned with the scene timeline 448, their horizontal position along the scene timeline 448 indicating their play time within the production as a whole as well as the scene(s) each audio element is played in.

Partial UI 1520 depicts an exploded audio timeline 1522. The VEM 214 may, for example, be configured to display the exploded audio timeline 1522 in response to an event that causes audio to come into focus—for example in response to user input that adds an audio element to the production, user input selecting a particular audio timing indicator 1504 displayed in the collapsed audio timeline 1502, or in response to an alternative event.

Exploded audio timeline 1522 is an exploded version of the collapsed audio timeline 1502. In the exploded audio timeline 1522 audio timing indicators 1504 are displayed so as to not overlap one another (but still maintain their timing alignment with the scene timeline 448). In the present embodiment, this involves the VEM 214 displaying concurrently playing audio elements in separate audio timeline ranks 1524, each audio timeline rank being parallel to the scene timeline 448. In partial UI 1520: audio timing indicator 1504A is displayed in a first rank 1524A; audio timing indicators 1504B, 1504C and 1504D are displayed in a second rank 1524B, and audio timing indicator 1504E is displayed in a third rank 1524C. The VEM 214 determines the number of audio timeline ranks 1524 required based on the maximum number of concurrently playing audio elements in the production. In this example the maximum number of concurrently playing audio elements is three (1504A, 1504C, and 1504E) and therefore three audio timeline ranks 1524 are displayed.

In the present example, when the exploded audio timeline 1522 is displayed the VEM 214 displays the scene previews 446 of the scene timeline 448 at a reduced size (when compared to their display size when the collapsed audio timeline 1522 is displayed). This provides additional display space within the timeline region 440 for the exploded audio timeline 1522. In this example the VEM 214 reduces the size of the scene previews 446 in one dimension (in this case the height) only so that the dimension indicating the duration of the scene (in this case the width) does not change. The VEM 214 is configured to determine the extent of the size reduction based on the number of audio timeline ranks 1524 that need to be displayed. For example, if only two timeline ranks 1524 are required the VEM 214 will reduce the height (in this case) of the scene previews 446 to a lesser extent than if four timeline ranks 1524 were required.

Where the VEM 214 transitions from the collapsed audio timeline 1502 to the exploded audio timeline 1522 this may be done by an animation or visual effect that provides the audio timing indicators 1504 with the appearance of floating or moving out to their audio timeline ranks 1524. Furthermore, where scene previews 446 are displayed at a reduced size this may also be via an animation giving the scene previews 446 the appearance of shrinking.

In the present implementation, the VEM 214 is configured to minimise the number of audio timeline ranks 1524 that are displayed in the exploded audio timeline 1522. To illustrate this, partial UI 1540 depicts partial UI 1520 following an adjustment to the timing of the audio element corresponding to audio timing indicator 1504E so that it no longer plays concurrently with the audio element corresponding to audio timing indicator 1504C. Following this adjustment the VEM 214 moves audio timing indicator 1504E into to the same rank as indicators 1504B/C/D. This removes the need to display/allow space for the third rank 1524C of partial UI 1520 which, in turn, provides additional space for the scene timeline 442. Accordingly, the display size of the scene previews 446B are enlarged (in this case height only) when compared to partial UI 1520 (though the scene previews 446B may still be displayed at a smaller size than in partial UI 1500 in which the collapsed audio timeline 1502 is displayed).

As an alternative example, partial UI 1560 shows partial UI 1520 following the addition of a further audio element to the production as indicated by audio timing indicator 1504F. The new audio element plays concurrently only with audio elements corresponding to timing indicators 1504A and 1504E. In this example the VEM 214 has displayed timing indicator 1504F in the second audio timeline rank 1524B.

In the present embodiments, a primary user interaction with an audio timing indicator 1504 (in either the collapsed timeline 1502 or exploded timeline 1522) causes selection of the audio element corresponding to the indicator that is interacted with. Such a primary user interaction may, for example, be a point and click interaction with the indicator 1504 using a pointing device. A secondary user interaction with an audio timing indicator 1504 (e.g. hovering over the indicator 1504 with a pointing device cursor) may cause details associated with the audio element to be displayed (e.g. a track name, play duration, and/or other details).

Figure 16:
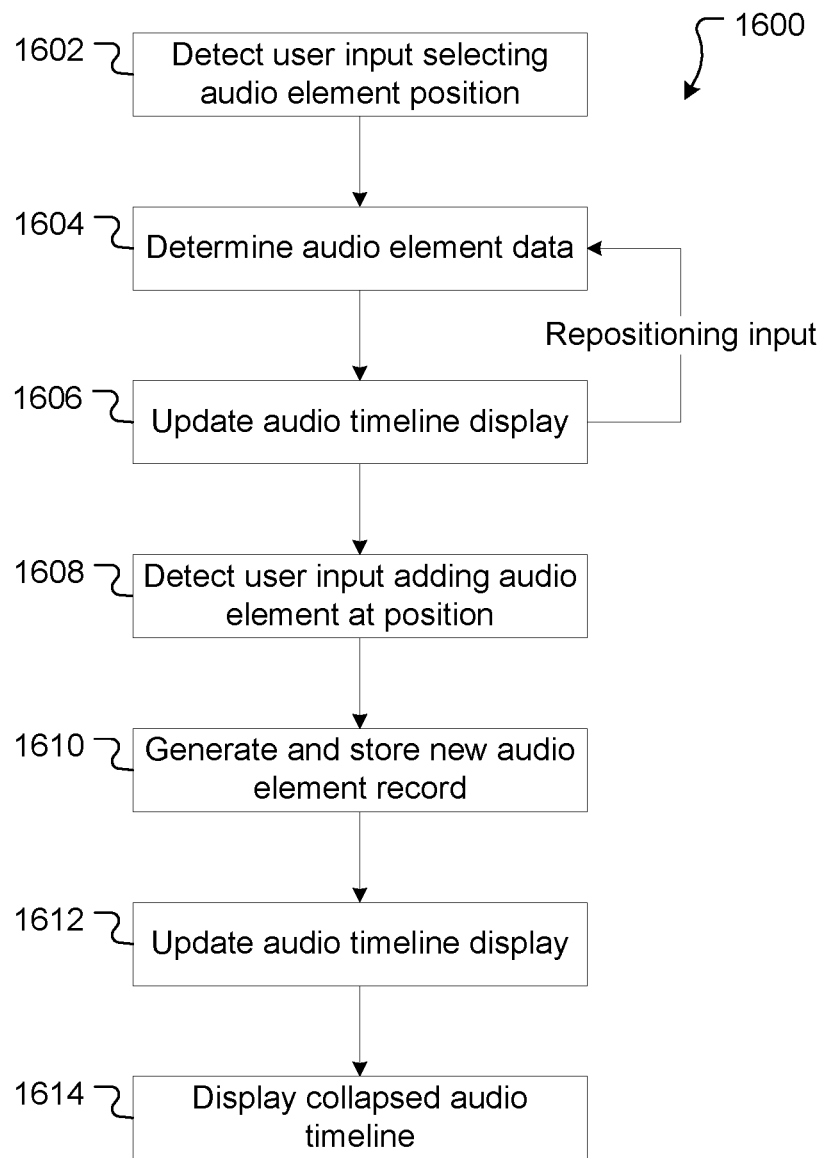
FIG. 16 is a flowchart depicting operations involved in adding an audio element to a digital video production.

Turning to FIG. 16, an audio element addition process 1600 will be described.

In the present example adding an audio element is a two stage process—an initial user input that selects a particular position (e.g. by dragging an audio element to the particular position or otherwise selecting the particular position) and a subsequent user input that places (e.g. drops or otherwise places) the audio element in the production at the particular position.

At 1602, the VEM 214 detects the initial user input to select a position to add a selected audio element to the production.

The user input may be input to add a selected audio element to a particular scene of the production. This may, for example, be by dragging the audio element onto a particular scene preview 446. In one implementation when an audio element is dragged over a scene preview 446 the VEM 214 alters the display of the scene preview 446 (e.g. by a colour overlay, glow/highlight, or other effect) to visually indicate to the user that if the user releases the audio element it will be added to that scene. Alternative user inputs to add a selected audio element to a particular scene are possible, for example user input specifying a particular scene from a menu or other UI element.

Alternatively, the user input may be to add a selected audio element to the entire production. This may be user input dragging an audio element onto the canvas 404 or an alternative user input.

Further alternatively, the user input may be to add the audio element to an arbitrary point in the production. This may, for example, be user input dragging the selected audio element to a particular timing position (in this case a horizontal position) along either the collapsed audio timeline 1502 (if displayed) or exploded audio timeline 1522 (if displayed), user input entering a production start offset timing value in a relevant input field, or an alternative user input.

At 1604, the VEM 214 determines element data in respect of the new audio element—in particular the production start offset and any end trim point. In the present embodiments, when an audio element is added no start trim value is set for the audio element and a default volume is used.

If the audio element is added to a particular scene of the production, the VEM 214 sets the start offset for the audio element to the production start time of the scene (calculated, for example, by adding the durations of any scenes preceding the particular scene). If the audio element's native duration is less than or equal to the duration of the particular scene no end trim value is set for the audio element. Otherwise, the VEM 214 sets the end trim value to the scene duration (i.e. so the audio track does not play for longer than the particular scene).

If the audio element is added to the entire production, the VEM 214 sets the start offset for the audio element to 0 seconds. If the audio element's native duration is less than or equal to the length of the entire production no end trim value is set. Otherwise, the VEM 214 sets the end trim value to the duration of the entire production (i.e. so the audio track does not play for longer than the production).

If the audio element is added to an arbitrary point in the production, the VEM 214 sets the start offset for the audio element based on the arbitrary point (e.g. based on where along the audio timeline the element is dropped or a specific start offset value as input by a user). If the audio element's native duration plus the start offset is less than or equal to the length of the entire production no end trim value is set. Otherwise, the VEM 214 sets the end trim value so that the audio element stops playing at the end of the production.

In some implementations, where the VEM 214 determines that setting an end trim point may be necessary it does so automatically and without user input. In other implementations, the VEM 214 alerts the user that trimming may be appropriate and requests user input confirming (or otherwise) that the audio element should be trimmed.

Attributes of the audio element (e.g. start offset, start trim value, end trim value, volume) may be adjusted by a user after the element has been added to the production.

At 1606, the VEM 214 updates display of the audio timeline to initially display an audio timing indicator for the new audio element. If a collapsed (or no) audio timeline 1502 is currently displayed the VEM 214 causes the exploded audio timeline 1522 to be displayed at 1606. In addition, the VEM 214 causes a new audio timing indicator to be displayed in the exploded audio timeline 1522. The position and length of the new timing indicator 1504 is based on the start offset and any end-trim value determined at 1604. In the present implementation, the VEM 214 initially displays the element's timing indicator 1504 adjacent the scene timeline 440 (in this particular example directly below the scene timeline) in its own audio timeline rank 1524. This provides a user with a clear indication of the timing/position of the new audio element relative to the scenes of the production.

If further user input is received that changes the selection position the VEM 214 updates the position of the new audio timing indicator accordingly, At 1608, the VEM 214 detects user input adding the audio element to the production at the selected position. This may, for example, be by dropping (e.g. releasing a mouse button or other input) the audio element at the selected position.

At 1610, responsive to the user input adding the audio element, the VEM 214 generates and stores a new audio element record. The data for the new audio element record is as last determined at 1604.

At 1612, the VEM 214 further updates the audio timeline (if necessary). In the present example, and where possible, this involves the VEM 214 adjusting the position of the new timing indicator displayed at 1606 to slot it into a gap in a pre-existing audio timeline rank 1524 (optionally via an animation to provide a user with a visual indicator of where the indicator 1504 has ended up).

In addition, the VEM 214 may update the playhead 454 to position it at the start of the newly added audio element's timing indicator 1504.

At 1614, the VEM 214 replaces display of the exploded audio timeline with a collapsed audio timeline. This may be following a predetermined delay period in which no interaction with the exploded audio timeline 1522 is detected and/or in response to an alternative event occurring.

Figure 17:
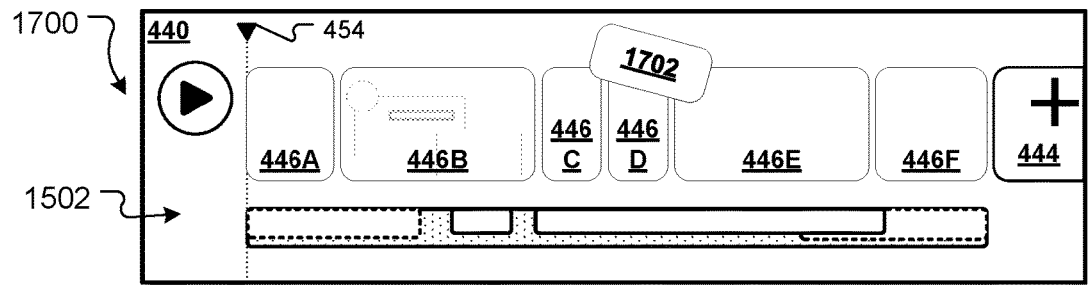
FIG. 17 depicts example digital video production user interfaces.
Figure 17:
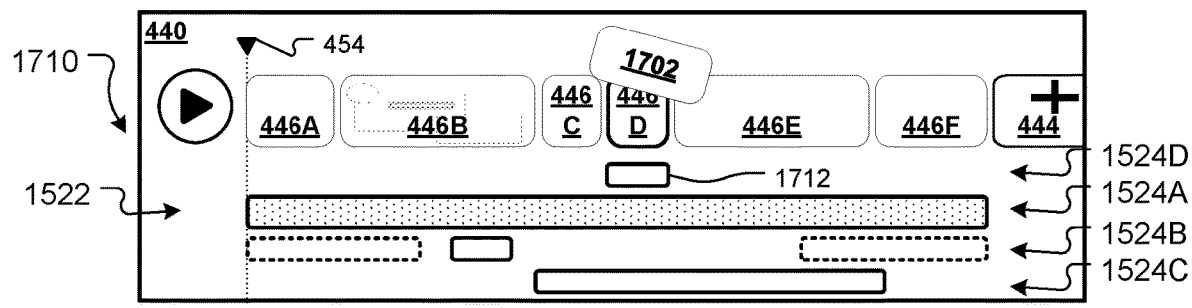
Figure 17:
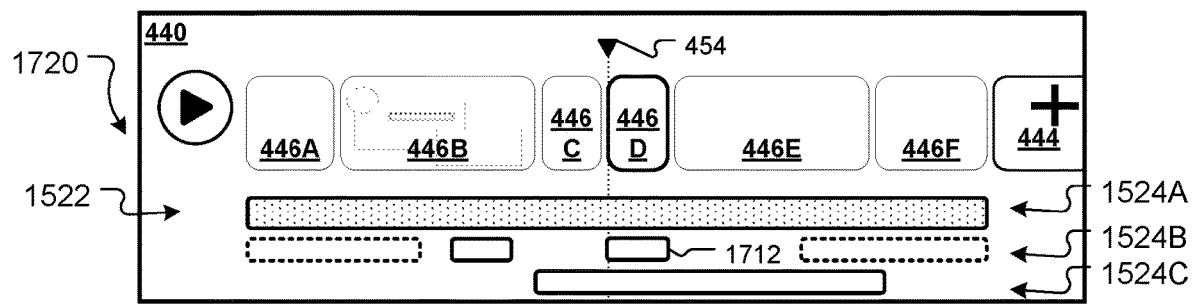
Figure 17:
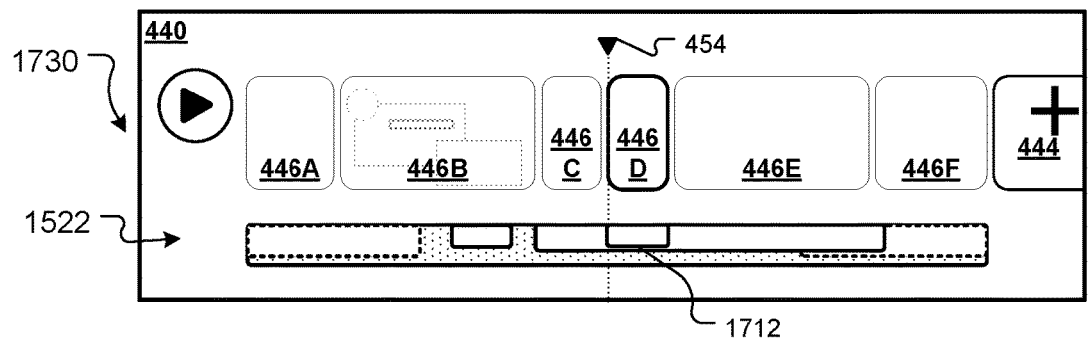

An example of adding an audio element to a production is provided with reference to FIG. 17.

At 1602, the VEM 214 detects user input positioning a new audio element—in this case user input dragging a representation 1702 of the new audio element onto a scene preview 446D. This is depicted by partial UI 1720. In this case the input is received while collapsed audio timeline 1502 is displayed.

At 1606, and as shown in UI 1710, the VEM 214 updates the audio timeline display. In this case this involves: replacing display of the collapsed timeline 1502 with exploded timeline 1522 and displaying an audio timing indicator 1712 corresponding to the new audio element in its own audio timeline rank 1524D. In addition, the VEM 214 in this example visually distinguishes scene preview 446B (with a heavier weight border).

At 1608, the VEM 214 detects user input to actually add the new audio element—e.g. dropping the representation 1702 onto scene preview 446D. At 1612 the VEM 214 further updates the audio timeline display. This is depicted by partial UI 1720 in which audio timing indicator 1712 has been moved to audio timeline rank 1524B and the scene previews 446 have been resized (larger) as rank 1524D is no longer required. In addition, the VEM 214 has updated the playhead 454 to position it at the start of the newly added audio element's timing indicator 1712 (which, in this example, is the start of scene 446D)

At 1614, the VEM 214 replaces display of the exploded timeline 1522 with collapsed timeline 1502 and enlarges the scene previews 446 (as shown in partial UI 1730).

Figure 18:
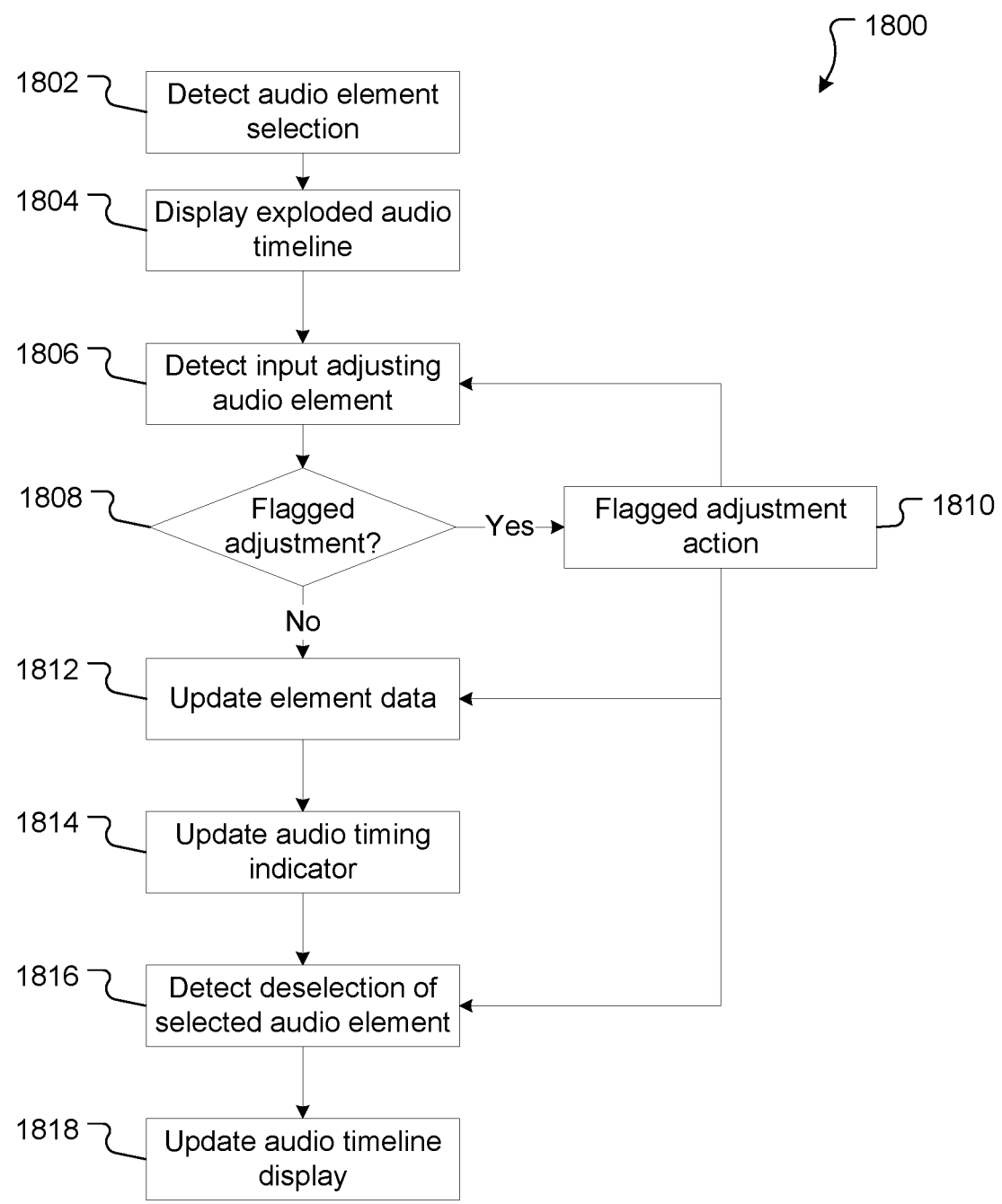
FIG. 18 is a flowchart depicting operations involved in adjusting the timing of an audio element.

Turning to FIG. 18, an audio element timing adjustment process 1800 will be described.

At 1802, the VEM 214 detects selection of a specific audio element added to a production. An audio element may be selected by interaction with an audio timing indicator (such as 1504 described above). Alternatively, an audio element may be selected by other means—e.g. via interaction with a menu or other UI element displaying a list of audio elements added to a production.

At 1804, and if not already displayed, the VEM 214 displays an exploded audio timeline.

At 1806, the VEM 214 detects user input adjusting the timing of the selected audio element. This input may be similar to, or the same as, the user input described with respect to adjusting the timing of a graphic element described at 1206 above, excepting the user interaction is with the selected audio element's timing indicator (e.g. 1504). For example, the user input may be adjust the start of the selected audio element (e.g. input dragging a start edge of the audio timing indicator 1504 to an earlier or later time), the end of the audio element (e.g. input dragging an end edge of the audio timing indicator 1504 to an earlier or later time), or the start and end of the audio element (e.g. input dragging the entire audio timing indicator 1504 to an earlier or later time slot).

At 1808, the VEM 214 determines if the adjustment is a flagged audio element timing adjustment. In the present embodiment, flagged audio element timing adjustments (and the action taken in response thereto) are similar to certain flagged timing adjustments described above.

As the flagging criteria (determined at 1808) and actions performed (at 1810) are similar to those described above they will not be described again in detail. By way of brief example, however, the VEM 214 may be configured to detect and take action in respect of an audio timing adjustment that: would result in an audio element start time for which no audio data exists (similar to 808 above); would require the audio element to loop (similar to 808 above, noting however that in the presently described implementation audio elements cannot be set to loop and therefore this is not an option/would be a prevented adjustment); seeks to have the audio element start before the first scene of the production (similar to 1208 above); and/or seeks to have the audio element end after the last scene of the production (similar to 1208 above).

At 1812, the VEM 214 updates the audio element data based on the adjustment. In the context of the production data described above this may involve updating the audio element's start offset and/or the audio element's trim data. This is similar to the timing adjustment of a video element as described above at 812, excepting that an audio element's start offset is with respect to the production as a whole and, in the presently described implementation, audio elements cannot be set to loop (though this could be implemented if desired).

At 1814, the VEM 214 updates the exploded audio timeline 1522 in line with the timing adjustment of the selected audio element. This is similar to the adjustments that may be made for a graphic element's visual timing indicator (e.g. 1302, as described above with reference to 1216 and FIG. 13). If the start time of the audio element has been adjusted, the VEM 214 displays the start edge 1644 of the timing indicator 1504 in a new position corresponding to the new start time. Similarly, if the end time of the audio element has been adjusted, the VEM 214 displays the end edge 1646 of the timing indicator 1504 in a new position corresponding to the new end time.

In addition, however, on adjusting an audio element's timing the VEM 214 also determines whether the adjustment is such that the timing indicator 1504 for the new element remains displayed in its current audio timeline rank 1524, needs to be displayed in a new audio timeline rank 1524, or can be displayed in another existing audio element timeline rank 1524.

If the element's adjusted timing is such that it can be positioned in a gap in another, existing timeline rank 1524, the VEM 214 shifts the element's timing indicator 1504 to that rank. This may allow the original rank of the adjusted element to be removed (if there are no other audio timing indicators 1524 in that rank—e.g. as described with respect to partial UI 1540 above). If the original rank can be removed the VEM 214 may also display the scene previews 446 at a larger size as described above.

If the element's adjusted timing is such that it overlaps another audio element indicator 1504 in the same rank 1524, and the indicator 1504 of the element being adjusted cannot be positioned in another existing rank 1524, the VEM 214 creates a new rank 1524 for the element's indicator 1504 and displays the indicator 1504 in that rank 1524. In this case, in order to provide display space, the VEM 214 may display the scene previews 446 at a smaller size as described above.

In addition, if the start time of the audio element has been adjusted the VEM 214 may update the playhead 454 to position it at the new start of the adjusted audio element's timing indicator 1504.

At 1816, the VEM 214 determines that the selected audio element has been deselected. This may, for example, be due to selection of a different audio element, selection of a toggle control to hide the audio timeline (e.g. the collapse audio timeline control 1632 or 1650 described above), a timeout period being reached, and/or an alternative event.

At 1818, in response to determining deselection of the selected audio element, the VEM 214 updates the audio timeline display. If an alternative audio element is selected, the VEM 214 may highlight the audio timing indicator 1504 corresponding to the newly selected audio element. If a timeout is detected without any interaction with an audio element, the VEM 214 may either display the collapsed audio timeline 1502 or remove display of the audio timeline altogether (i.e. so neither a collapsed or exploded audio timeline is displayed).

In the present embodiments, audio elements are not associated with scenes (and do not impact scene length). Nor are visual previews of audio elements provided in scene previews 446. Accordingly, on user interaction to delete an audio element the VEM 214 can delete the selected element's record from the audio element data (e.g. from the array of audio elements). If an audio timeline (collapsed or exploded) is displayed, the VEM 214 also removes the audio timing indicator 1504 for the deleted element from the audio timeline.

The foregoing description describes various user interactions—for example the selection, activation, interaction, or other manipulation of various user interface elements.

Generally speaking, a given UI element can be interacted with in various ways, and the particular interaction will depend on the type of UI element and the input device(s) available to client system 210.

For example, activation or selection of a particular UI control may be achieved by: contacting a touch screen display such as 318 on or near the region the control is displayed on; moving a pointing device such as a mouse or trackpad so a cursor is on/near the displayed control and clicking or otherwise selecting the control; providing a keyboard shortcut and detecting use of that keyboard shortcut; and/or other inputs.

By way of further example, input to enter text may be achieved by a hardware keyboard connected to system 210 and/or or a software keyboard displayed by a display of system 210 (which is manipulated by touch if the display is a touch screen display and/or pointing device inputs).

By way of still further example, user interaction to scroll through user interface elements (e.g. scrolling through search results 424 or scenes 446) may be by interaction with a scroll bar or general user interface region using a pointing device (e.g. by clicking and dragging a scroll bar handle or a general display region), or touch screen (e.g. contacting a scroll bar handle and dragging it or generally swiping in a display region).

In the present disclosure, therefore, unless specified any appropriate user interaction may be used to interact with a user interface element.

The foregoing description also describes various scenarios in which one or more UI elements are visually distinguished from one or more other UI elements. For example, in FIG. 4 the selected element type control 410A is visually distinguished from the non-selected element type controls.

Generally speaking, various mechanism for visually distinguishing UI elements may be used. By way of example, one or more of the following techniques may be used: different line weights or types for UI element bounding boxes; use of colour vs greyscale display; use of contrasting colours (e.g. different colours, faded vs full colours); use of transparency/opacity; displaying additional text and/or images (e.g. icons or the like); and/or use of any other visual feature to distinguish one or more UI elements from one or more other UI elements.

The following numbered clauses describe additional, specific embodiments of the disclosure:

Clause 1. A computer implemented method comprising:
  accessing production data in respect of a video production, the production data including scene data defining one or more scenes of the video production and visual element data defining one or more visual elements of the video production, each visual element being associated with a scene;
  displaying, on a display, a scene timeline, the scene timeline including a time-ordered sequence of scene previews, each scene preview corresponding to a scene of the one or more scenes and having a display width that provides a visual indication of a duration of the corresponding scene;
  detecting selection of a first scene preview from the scene timeline, the first scene preview associated with a first scene of the video production;
  in response to detecting selection of the first scene preview, displaying a canvas including a first visual element that is associated with the first scene, the first visual element associated with a first visual element start time and a first visual element end time;
  detecting selection of the first visual element from the canvas; and
  in response to detecting selection of the first visual element from the canvas, causing a first visual element timing indicator to be displayed, the first visual element timing indicator aligned with the scene timeline based on the first visual element start time and the first visual element end time.

Clause 2. The computer implemented method of clause 1, wherein in response to detecting selection of the first visual element from the canvas the method further comprises displaying the scene previews in the scene timeline at a reduced size.

Clause 3. The computer implemented method of clause 2, wherein displaying the scene previews in the scene timeline at a reduced size includes maintaining a current width of the scene previews but displaying the scene previews with a reduced height.

Clause 4. The computer implemented method of any one of clauses 1 to 3, further including:
  determining that the first visual element has been deselected; and
  in response to determining that the first visual element has been deselected, ceasing to display the first visual element timing indicator.

Clause 5. The computer implemented method of clause 4, wherein in response to determining that the first visual element has been deselected, the method further comprises displaying the scene previews in the scene timeline at a normal size.

Clause 6. The computer implemented method of any one of clauses 1 to 3, wherein the canvas further comprises a second visual element that is associated with the first scene, the second visual element associated with a second visual element start time and a second visual element end time, and wherein the method further comprises:
  detecting selection of the second visual element from the canvas; and
  in response to detecting selection of the second visual element from the canvas, replacing display of the first visual element timing indicator with display of a second visual element timing indicator, the second visual element timing indicator aligned with the scene timeline based on the second visual element start time and the second visual element end time.

Clause 7. The computer implemented method of any one of clauses 1 to 6, wherein the first scene preview includes a representation of the first visual element.

Clause 8. The computer implemented method of clause 7, further including:
  determining, based on the first visual element start time and the first visual element end time, that the first visual element does not play for an entire duration of the first scene; and
  in response to determining that the first visual element does not play for the entire duration of the first scene, displaying a partial-scene indicator on or proximate the representation of the first visual element in the first scene preview.

Clause 9. The computer implemented method of any one of clauses 1 to 8, further including:
  detecting a first user interaction with the first visual element timing indicator, the first user interaction being to adjust a play timing of the first visual element; and
  in response to detecting the first user interaction:
    updating the production data to record the first visual element's adjusted play timing; and
    updating display of the first visual element timing indicator to reflect the first visual element's adjusted play timing.

Clause 10. The computer implemented method of clause 9, wherein:
  the first user interaction is with a start control associated with the first visual element timing indicator; and
  the adjustment to the first visual element's play timing is an adjustment to the first visual element start time.

Clause 11. The computer implemented method of clause 9, wherein:
  the first user interaction is with an end control associated with the first visual element timing indicator; and
  the adjustment to the first visual element's play timing is an adjustment to the first visual element end time.

Clause 12. The computer implemented method of clause 9, wherein:
  the first user interaction is with the first visual element timing indicator as a whole; and the adjustment to the first visual element's play timing is an adjustment to the first visual element start time and the first visual element end time.

Clause 13. The computer implemented method of any one of clauses 1 to 12, wherein the first visual element is a video element.

Clause 14. The computer implemented method of any one of clauses 1 to 13, wherein the first visual element is a graphic element.

Clause 15. The computer implemented method of clause 14, wherein the first visual element is further associated with a second scene of the video production.

Clause 16. The computer implemented method of any one of clauses 1 to 15, wherein the first visual element end time is calculated based on the first visual element start time and a first visual element duration.

Clause 17. A computer implemented method including:
  accessing production data in respect of a video production, the production data defining:
    a first audio element having a first element play time within the production, the first element play time extending between a first element start time and a first element end time; and
    a second audio element having a second element play time within the production, the second element play time extending between a second element start time and a second element end time, the second element play time at least partially overlapping with the first element play time;
  displaying, on a display, a collapsed audio timeline including a first audio timing indicator corresponding to the first audio element and a second audio timing indicator corresponding to the second audio element, wherein in the collapsed audio timeline:
    the first audio timing indicator has a first indicator start displayed at a horizontal position that corresponds to the first element start time, a first indicator end displayed at a horizontal position that corresponds to the first element end time, and a first indicator display height;
    the second audio timing indicator has a second indicator start displayed at a horizontal position that corresponds to the second element start time, a second indicator end displayed at a horizontal position that corresponds to the second element end time, and a second indicator display height;
    the first audio timing indicator and the second audio timing indicator are both displayed on a first rank such that first audio timing indicator and the second audio timing indicator vertically overlap;
    the second audio timing indicator is displayed in front of the first audio timing indicator; and
    the second indicator display height is less than the first indicator display height.

Clause 18. The computer implemented method of clause 17, further including:
  displaying, on the display, an exploded audio timeline, wherein in the exploded audio timeline:
    the second audio timing indicator is displayed in a second timeline rank instead of the first timeline rank such that the second audio timing indicator does not vertically overlap the first audio timing indicator.

Clause 19. The computer implemented method of clause 17, wherein:
  the production data defines a third audio element having a third element play time within the production, the third element play time extending between a third element start time and a third element end time, the third element play time at least partially overlapping with both the first element play time and the second element play time;
  the collapsed audio timeline includes a third audio timing indicator corresponding to the third audio element; and
  in the collapsed audio timeline:
    the third audio timing indicator has a third indicator start displayed at a horizontal position that corresponds to the third element start time, a third indicator end displayed at a horizontal position that corresponds to the third element end time, and a third indicator display height;
    the third audio timing indicator is displayed on the first rank such that the third audio timing indicator vertically overlaps the first audio timing indicator and the second audio timing indicator, the third audio timing indicator being displayed in front of the second audio timing indicator; and
    the third indicator display height is less than the second indicator display height.

Clause 20. The computer implemented method of clause 19, further including:
  displaying, on the display, an exploded audio timeline, wherein in the exploded audio timeline:
    the second audio timing indicator is displayed in a second timeline rank instead of the first timeline rank such that the second audio timing indicator does not vertically overlap the first audio timing indicator or the third audio timing indicator; and
    the third audio timing indicator is displayed in a third timeline rank instead of the first timeline rank such that the third audio timing indicator does not vertically overlap the first audio timing indicator or the second audio timing indicator.

Clause 21. The computer implemented method of clause 20, wherein while displaying the exploded audio timeline the method further comprises:
  detecting a first user input that alters the second element play time or the third element play time so that the second element play time and the third element play time no longer overlap; and
  in response to detecting the first user input, displaying the second audio timing indicator and the third audio timing indicator on the same timeline rank such that the second audio timing indicator is vertically aligned with the third audio timing indicator.

Clause 22. The computer implemented method of clause 17 or clause 19, wherein:
  the production data defines a fourth audio element having a fourth element play time within the production, the fourth element play time extending between a fourth element start time and a fourth element end time, the fourth element play time at least partially overlapping the first element play time, the fourth element play time not overlapping the second element play time;
  the collapsed audio timeline includes a fourth audio timing indicator corresponding to the fourth audio element; and
  in the collapsed audio timeline:
    the fourth audio timing indicator has a fourth indicator start displayed at a horizontal position that corresponds to the fourth element start time, a fourth indicator end displayed at a horizontal position that corresponds to the fourth element end time, and a fourth indicator display height;

the fourth audio timing indicator is displayed on the first rank such that the fourth audio timing indicator vertically overlaps the first audio timing indicator, the fourth audio timing indicator being displayed in front of the first audio timing indicator; and the fourth indicator display height is less than the first indicator display height.

Clause 23. The computer implemented method of clause 22, wherein in the collapsed audio timeline the fourth indicator display height is equal to the second indicator display height.

Clause 24. The computer implemented method of clause 22 or clause 23, further including:

displaying, on the display, an exploded audio timeline, wherein in the exploded audio timeline:

the second audio timing indicator is displayed in a second timeline rank instead of the first timeline rank such that the second audio timing indicator does not vertically overlap the first audio timing indicator; and the fourth audio timing indicator is displayed in the second timeline rank instead of the first timeline rank such that the fourth audio timing indicator is vertically aligned with the second audio timing indicator.

Clause 25. The computer implemented method of clause 24, wherein while displaying the exploded audio timeline the method further comprises:

detecting a second user input that alters the second element play time or the fourth element play time so that the second element play time and the fourth element play time at least partially overlap; and in response to detecting the second user input, displaying the second audio timing indicator and the fourth audio timing indicator on different timeline ranks such that the fourth audio timing indicator does not vertically overlap the second audio timing indicator.

Clause 26. The computer implemented method of any one of clauses 18, 20, 21, 24, or 25, wherein the exploded audio timeline is displayed in response to detecting user input selecting one of the audio timing indicators.

Clause 27. The computer implemented method of any one of clauses 18, 20, 21, 24, or 25, wherein the exploded audio timeline is displayed in response to detecting user input that adds a new audio element to the production.

Clause 28. The computer implemented method of any one of clauses 18, 20, 21, 24, or 25, further including:

detecting a third user input that adds a fifth audio element to the production, the fifth audio element having a fifth element play time within the production, the fifth element play time extending between a fifth element start time and a fifth element end time;

determining whether the fifth element play time matches a gap in any existing timeline rank, wherein the fifth element playtime will match a gap in an existing timeline rank if the fifth element playtime does not overlap or partially overlap the playtime of any other audio element for which a corresponding audio timing indicator is displayed in the existing timeline rank; and in response to determining that the fifth element play time matches a gap in the existing timeline rank, displaying a fifth audio timing indicator corresponding to the fifth audio element in the existing timeline rank.

Clause 29. The computer implemented method of any one of clauses 18, 20, 21, 24, or 25, further including:

detecting a third user input that adds a fifth audio element to the production, the fifth audio element having a fifth element play time within the production, the fifth element play time extending between a fifth element start time and a fifth element end time;

determining whether the fifth element play time matches a gap in any existing timeline rank, wherein the fifth element playtime will match a gap in an existing timeline rank if the fifth element playtime does not overlap or partially overlap the playtime of any other audio elements for which corresponding audio timing indicators are displayed in the existing timeline rank; and in response to determining that the fifth element playtime does not match a gap any existing timeline rank, displaying a fifth audio timing indicator corresponding to the fifth audio element in a new timeline rank.

Clause 30. The computer implemented method of clause 28 or clause 29, wherein the exploded audio timeline is displayed in response to detecting the user input that adds the fifth audio element to the production.

Clause 31. The computer implemented method of any one of clauses 18, 20, 21, 24, or 25, 26, 27, 28, 29, 30, wherein following display of the exploded audio timeline the method further comprises redisplaying the collapsed audio timeline.

Clause 32. The computer implemented method of clause 31, wherein the collapsed audio timeline is redisplayed following a predetermined delay period in which no interaction with the exploded audio timeline is detected.

Clause 33. The computer implemented method of any one of clauses 17 to 32, wherein each audio timing indicator is displayed using a display format that indicates a type of the audio element that the audio timing indicator corresponds to.

Clause 34. The computer implemented method of clause 33, wherein the display format used to indicate the type of an audio element is selected from a group including: a first display format indicating a music audio element; a second display format indicating a spoken word audio element; and a third display format indicating a sound effect audio element.

Clause 35. The computer implemented method of any one of clauses 17 to 34, wherein the first element play time is longer than the second element play time.

Clause 36. A computer processing system comprising:
 a processing unit;
 a display; and
 non-transitory computer-readable storage medium storing instructions, which when executed by the processing unit, cause the processing unit to perform a method according to any one of clauses 1 to 35.

Clause 37. A non-transitory storage medium storing instructions executable by a processing unit to cause the processing unit to perform a method according to any one of clauses 1 to 35.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required by context, the terms "first", "second", etc. are used to differentiate between various elements and features and not in an ordinal sense. For example, a first user input could be termed a second user input, and, similarly, a second user input could be termed a first user input, without departing from the scope of the various described examples. By way of further example, in certain cases a second user input could occur before a first user input and/or without a first user input ever occurring.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
   accessing production data in respect of a video production, the production data including scene data defining one or more scenes of the video production and visual element data defining one or more visual elements of the video production, each visual element being associated with a scene;
   displaying, on a display, a scene timeline, the scene timeline including a time-ordered sequence of scene previews, each scene preview corresponding to a scene of the one or more scenes and having a display width that provides a visual indication of a duration of the corresponding scene;
   detecting selection of a first scene preview from the scene timeline, the first scene preview associated with a first scene of the video production;
   in response to detecting selection of the first scene preview, displaying a canvas including a first visual element that is associated with the first scene, the first visual element associated with a first visual element start time and a first visual element end time;
   detecting selection of the first visual element from the canvas; and
   in response to detecting selection of the first visual element from the canvas, causing a first visual element timing indicator to be displayed, wherein:
      a start edge of the first visual element timing indicator is aligned with a first position on the scene timeline, wherein the first position on the scene timeline corresponds to the first visual element start time within the video production; and
      an end edge of the first visual element timing indicator is aligned with a second position on the scene timeline, wherein the second position on the scene timeline corresponds to the first visual element end time within the video production.

2. The computer implemented method of claim 1, wherein in response to detecting selection of the first visual element from the canvas the method further comprises displaying the scene previews in the scene timeline at a reduced size.

3. The computer implemented method of claim 1, further comprising:
   determining that the first visual element has been deselected; and
   in response to determining that the first visual element has been deselected, ceasing to display the first visual element timing indicator.

4. The computer implemented method of claim 1, wherein the canvas further includes a second visual element that is associated with the first scene, the second visual element associated with a second visual element start time and a second visual element end time, and wherein the method further comprises:
   detecting selection of the second visual element from the canvas; and
   in response to detecting selection of the second visual element from the canvas, replacing display of the first visual element timing indicator with display of a second visual element timing indicator, the second visual element timing indicator aligned with the scene timeline based on the second visual element start time and the second visual element end time.

5. The computer implemented method of claim 1, wherein the first scene preview includes a representation of the first visual element.

6. The computer implemented method of claim 5, further comprising:
   determining, based on the first visual element start time and the first visual element end time, that the first visual element does not play for an entire duration of the first scene; and
   in response to determining that the first visual element does not play for the entire duration of the first scene, displaying a partial-scene indicator on or proximate the representation of the first visual element in the first scene preview.

7. The computer implemented method of claim 1, further comprising:
   detecting a first user interaction with the first visual element timing indicator, the first user interaction being to adjust a play timing of the first visual element; and
   in response to detecting the first user interaction:
      updating the production data to record the first visual element's adjusted play timing; and
      updating display of the first visual element timing indicator to reflect the first visual element's adjusted play timing.

8. The computer implemented method of claim 7, wherein: the first user interaction is interaction with a start control associated with the first visual element timing indicator; and the adjustment to the first visual element's play timing is an adjustment to the first visual element start time.

9. The computer implemented method of claim 7, wherein: the first user interaction is interaction with an end control associated with the first visual element timing indicator; and the adjustment to the first visual element's play timing is an adjustment to the first visual element end time.

10. The computer implemented method of claim 7, wherein: the first user interaction is with the first visual element timing indicator as a whole; and the adjustment to the first visual element's play timing is an adjustment to the first visual element start time and the first visual element end time.

11. The computer implemented method of claim 1, wherein the first visual element is further associated with a second scene of the video production.

12. The computer implemented method of claim 1, wherein: the scene timeline and the first visual element timing indicator are displayed in a first user interface region; and the canvas is displayed in a second user interface region, the second user interface region being separate to the first user interface region.

13. The computer implemented method of claim 1, further comprising displaying a playhead, the playhead including a straight-line indicator that indicates a current playback position within the video production, and wherein the straight-line indicator passes through both the first visual element timing indicator and the scene timeline.

14. A computer processing system comprising:
a processing unit;
a display; and
non-transitory computer-readable storage medium storing instructions, which when executed by the processing unit, cause the processing unit to:
access production data in respect of a video production, the production data including scene data defining one or more scenes of the video production and visual element data defining one or more visual elements of the video production, each visual element being associated with a scene;
display, on the display, a scene timeline, the scene timeline including a time-ordered sequence of scene previews, each scene preview corresponding to a scene of the one or more scenes and having a display width that provides a visual indication of a duration of the corresponding scene;
detect selection of a first scene preview from the scene timeline, the first scene preview associated with a first scene of the video production;
in response to detecting selection of the first scene preview, display a canvas including a first visual element that is associated with the first scene, the first visual element associated with a first visual element start time and a first visual element end time;
detect selection of the first visual element from the canvas; and
in response to detecting selection of the first visual element from the canvas, cause a first visual element timing indicator to be displayed, wherein:
a start edge of the first visual element timing indicator is aligned with a first position on the scene timeline, wherein the first position on the scene timeline corresponds to the first visual element start time within the video production; and
an end edge of the first visual element timing indicator is aligned with a second position on the scene timeline, wherein the second position on the scene timeline corresponds to the first visual element end time within the video production.

15. The computer processing system of claim 14, wherein in response to detecting selection of the first visual element from the canvas, the instructions, when executed by the processing unit, further cause the processing unit to display the scene previews in the scene timeline at a reduced size.

16. The computer processing system of claim 14, wherein the canvas further includes a second visual element that is associated with the first scene, the second visual element associated with a second visual element start time and a second visual element end time, and wherein the instructions, when executed by the processing unit, further cause the processing unit to:
detect selection of the second visual element from the canvas; and
in response to detecting selection of the second visual element from the canvas, replace display of the first visual element timing indicator with display of a second visual element timing indicator, the second visual element timing indicator aligned with the scene timeline based on the second visual element start time and the second visual element end time.

17. The computer processing system of claim 14, wherein the first scene preview includes a representation of the first visual element.

18. The computer processing system of claim 14, wherein the instructions, when executed by the processing unit, further cause the processing unit to:
detect a first user interaction with the first visual element timing indicator, the first user interaction being to adjust a play timing of the first visual element; and
in response to detecting the first user interaction:
update the production data to record the first visual element's adjusted play timing; and
update display of the first visual element timing indicator to reflect the first visual element's adjusted play timing.

19. The computer processing system of claim 14, wherein: the scene timeline and the first visual element timing indicator are displayed in a first user interface region; and the canvas is displayed in a second user interface region, the second user interface region being separate to the first user interface region.

20. The computer processing system of claim 14, further comprising displaying a playhead, the playhead including a straight-line indicator that indicates a current playback position within the video production, and wherein the straight-line indicator passes through both the first visual element timing indicator and the scene timeline.

* * * * *